June 19, 1962 J. C. SHAVER 3,039,679

INFORMATION TRANSLATION SYSTEM

Filed Nov. 8, 1957 24 Sheets-Sheet 1

INVENTOR.
JAY C. SHAVER
BY John A. Harvey
ATTORNEY

TABLE A

| CONTACT NO. | ZONE 12 | ZONE 11 | ZONE 0 | |
|---|---|---|---|---|
| 1 | A | J | / | 1 |
| 2 | B | K | S | 2 |
| 3 | C | L | T | 3 |
| 4 | D | M | U | 4 |
| 5 | E | N | V | 5 |
| 6 | F | O | W | 6 |
| 7 | G | P | X | 7 |
| 8 | H | Q | Y | 8 |
| 9 | I | R | Z | 9 |
| 8-3 | . | $ | , | # |
| 8-4 | ¤ | * | % | @ |
| | & | – | 0 | |

INVENTOR.
JAY C. SHAVER
BY John A. Harvey
ATTORNEY

INFORMATION TRANSLATION SYSTEM

Filed Nov. 8, 1957 24 Sheets-Sheet 3

INVENTOR.
JAY C. SHAVER
BY John A. Harvey
ATTORNEY

INFORMATION TRANSLATION SYSTEM

Filed Nov. 8, 1957 24 Sheets-Sheet 4

INVENTOR.
JAY C. SHAVER
BY John A. Harvey
ATTORNEY

June 19, 1962 J. C. SHAVER 3,039,679

INFORMATION TRANSLATION SYSTEM

Filed Nov. 8, 1957 24 Sheets-Sheet 5

INVENTOR.
JAY C. SHAVER
BY John A. Harvey
ATTORNEY

INVENTOR.
JAY C. SHAVER
BY John A. Harvey
ATTORNEY

June 19, 1962 J. C. SHAVER 3,039,679

INFORMATION TRANSLATION SYSTEM

Filed Nov. 8, 1957 24 Sheets-Sheet 7

INVENTOR.
JAY C. SHAVER
BY John A. Harvey
ATTORNEY

INVENTOR.
JAY C. SHAVER
BY John A. Harvey
ATTORNEY

INVENTOR.
JAY C. SHAVER
BY John A. Harvey
ATTORNEY

INVENTOR.
JAY C. SHAVER
BY John A. Harvey
ATTORNEY

INVENTOR.
JAY C. SHAVER
BY John A. Harvey
ATTORNEY

INVENTOR.
JAY C. SHAVER
BY John A. Harvey
ATTORNEY

INVENTOR.
JAY C. SHAVER
BY John A. Harvey
ATTORNEY

June 19, 1962 J. C. SHAVER 3,039,679

INFORMATION TRANSLATION SYSTEM

Filed Nov. 8, 1957 24 Sheets-Sheet 14

INVENTOR.
JAY C. SHAVER
BY John A. Harvey
ATTORNEY

INVENTOR.
JAY C. SHAVER
BY John A. Harvey
ATTORNEY

June 19, 1962 J. C. SHAVER 3,039,679

INFORMATION TRANSLATION SYSTEM

Filed Nov. 8, 1957 24 Sheets-Sheet 16

INVENTOR.
JAY C. SHAVER
BY John A. Harvey
ATTORNEY

June 19, 1962 J. C. SHAVER 3,039,679

INFORMATION TRANSLATION SYSTEM

Filed Nov. 8, 1957 24 Sheets-Sheet 17

INVENTOR.
JAY C. SHAVER
BY John A. Harvey
ATTORNEY

INVENTOR.
JAY C. SHAVER
BY John A. Harvey
ATTORNEY

INVENTOR.
JAY C. SHAVER
BY John A. Harvey
ATTORNEY

INVENTOR.
JAY C. SHAVER
BY John A. Harvey
ATTORNEY

INVENTOR.
JAY C. SHAVER
BY John A. Harvey
ATTORNEY

INVENTOR.
JAY C. SHAVER
BY John A. Harvey
ATTORNEY

June 19, 1962 J. C. SHAVER 3,039,679

INFORMATION TRANSLATION SYSTEM

Filed Nov. 8, 1957 24 Sheets-Sheet 23

INVENTOR.
JAY C. SHAVER
BY John A. Harvey
ATTORNEY

June 19, 1962 J. C. SHAVER 3,039,679

INFORMATION TRANSLATION SYSTEM

Filed Nov. 8, 1957 24 Sheets-Sheet 24

INVENTOR.
JAY C. SHAVER
BY John A. Harvey
ATTORNEY

United States Patent Office 3,039,679

Patented June 19, 1962

3,039,679
INFORMATION TRANSLATION SYSTEM

Jay C. Shaver, Atlanta, Ga., assignor to Commercial Controls Corporation, Rochester, N.Y., a corporation of Delaware Filed Nov. 8, 1957, Ser. No. 695,459
52 Claims. (Cl. 234—36)

Figure 4:
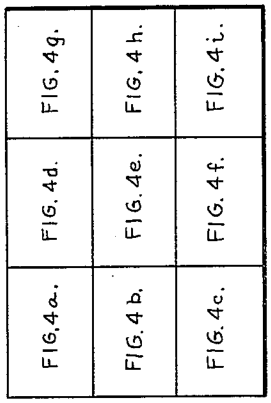

The present invention relates to punched-card information translation systems and, more particularly, to systems for recording information in tabulating cards and systems for reading and utilizing information recorded in tabulating cards.

Many forms of present day business machines utilize punched tabulating cards to record information processed by the machine or from which to receive information for processing by the machine. Such information is recorded within a specified area of the tabulating card, the area being arranged in columns and rows of "index points." Conventionally there are 12 rows of such index points of which rows Nos. 11 and 12 are identified as "zone rows" punched to provide control of machine functions and to identify alphabetic information, rows Nos. 1–9 identified as alpha-numeric rows, and a final row sometimes referred to as a "zero" row and other times referred to as a "No. 10" row utilized for both zone and numeric purposes. The utilization of these index points for recording information is by use of the so-called Hollerith 12-bit code, each column of index points recording a single alphabetic, numeric, or symbol character and successive such columns constituting a "field" within which one or more words of alphabetic or numeric information or combined alphabetic and numeric information is recorded.

One form of present day business machine is called a tabulating card punch and includes a manually actuable keyboard by which an operator may effect manual recording of information in tabulating cards. Certain types of such information recorded in an initial or master card are of general nature, such as the customer account number, the sales territory within which the customer is located, and the invoice number and date of a particular order of merchandise. Other information is usually specific to each of a series of tabulating cards accompanying the master card, such as the identification of an individual item of merchandise sold together with the quantity ordered and shipped and the unit price of that item. The general information is operator-recorded in a first tabulating card and each item of specific information in one of a series thereof which together record a given transaction. The card punch machine conventionally includes a program card which controls certain of the machine operations to effect both automatic selection of recording fields in successive cards and duplication of certain transaction-identifying general information into each card subsequent to the first card of the series.

The manual operating controls of a card punch machine of the type last described are such that it is the usual business practice to employ specially trained operators for operation of these machines. It would be desirable, however, to be able to prepare punched cards by use of ordinary typists operating a typewriter in typing business forms and with the punched cards produced as a direct by-product of the typing operation. At the same time, not all typed information of a given business form is ordinarily punched in a tabulating card since the latter possesses only a limited record capacity and efficient utilization of this capacity dictates recording of a condensed quantity of essential information. It would accordingly be desirable, in the interests of minimizing the supervisory attention required of the typist, automatically to select from the information typed only essential information to be punch recorded in a tabulating card. This essential information varies, of course, with respect to different forms to be prepared by typing so that corresponding changes in the selection of the essential information for punch recording should be readily and conveniently effected in a simple manner with change of the form in preparation.

It is an object of the present invention to provide a novel record system which possesses the desirable characteristics last enumerated.

It is a further object of the invention to provide an improved record system which enables the preparation of punched tabulating cards automatically and in routine manner with little or no operator attention and as a direct by-product of a typing operation.

It is an additional object of the invention to provide a novel system for translating information to and from punch recording in a tabulating card, and one which does this in an essentially automatic manner while at the same time automatically insuring that the information translation is clearly identified with preselected successive information fields of the card.

It is yet a further object of the invention to effect information translation between a typewriter and a tabulating card punch-reader unit while automatically insuring that each of preselected character positions in each line of typed information accurately corresponds to a preselected one of plural index point columns of a tabulating card moving through the punch-reader unit under control of the typewriter operations.

It is an additional object of the invention to provide an intercontrolled typewriter and tabulating card punch-reader unit by which information transfer between the typewriter and punch-reader unit is permitted to continue as long as their operations progress in a proper interrelationship but automatically to terminate the information transfer and to deactivate the typewriter upon departure of such interrelated operations for any reason.

Figure 2:
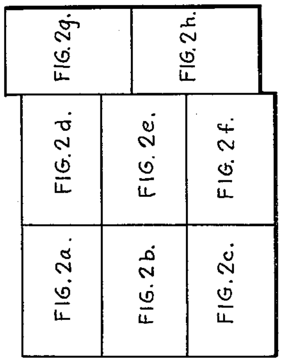
Figure 1:
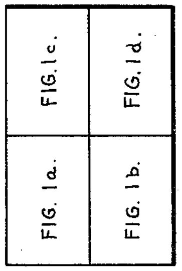
Figure 49:
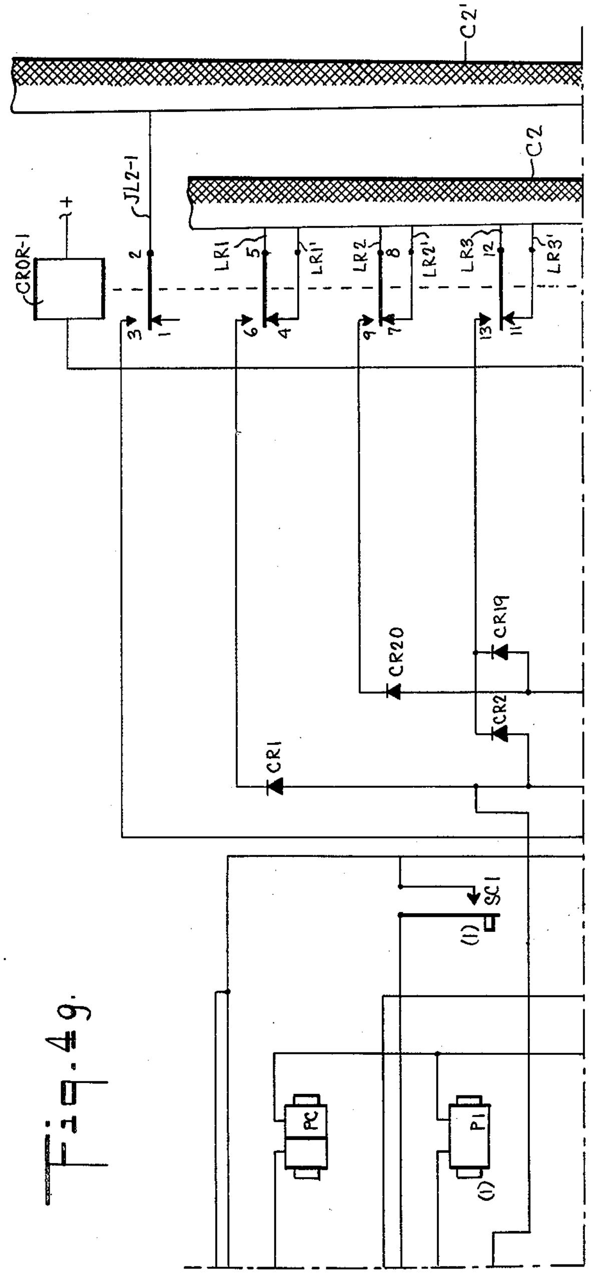
Figures 1A, 5:
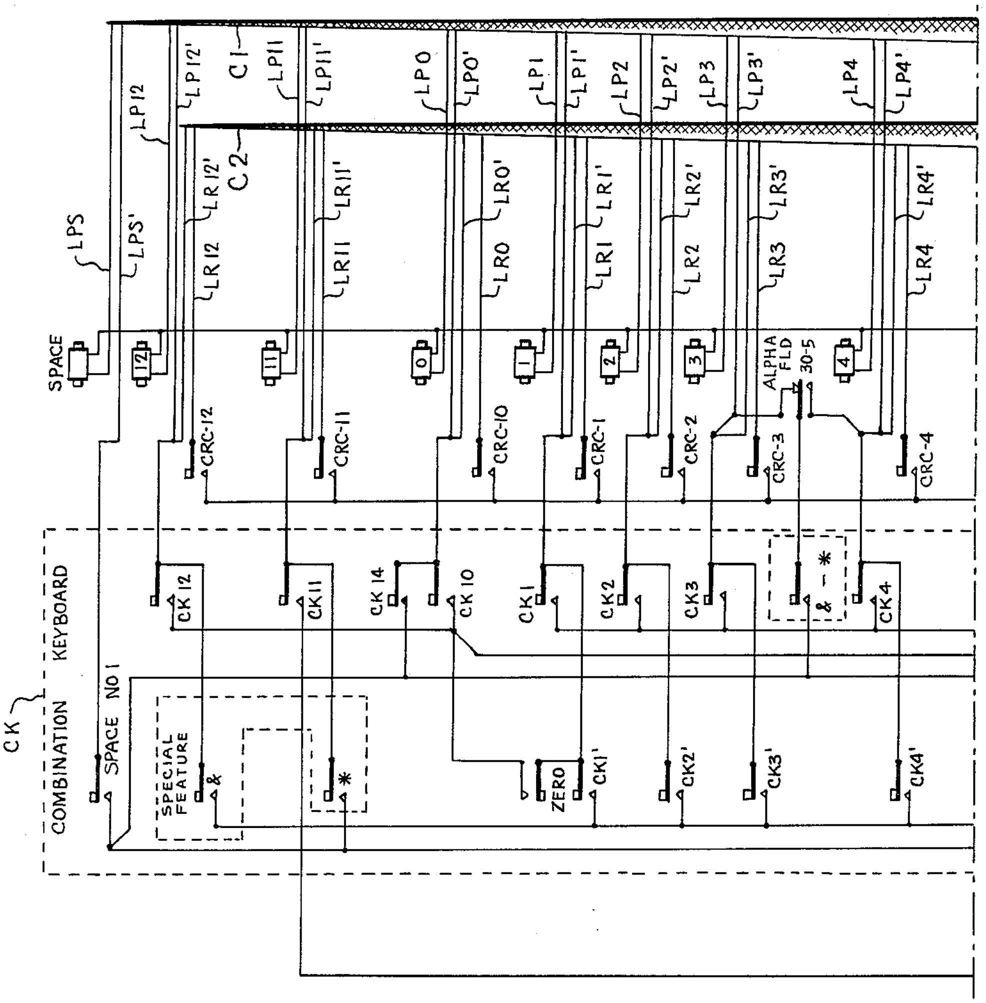
Figure 3A:
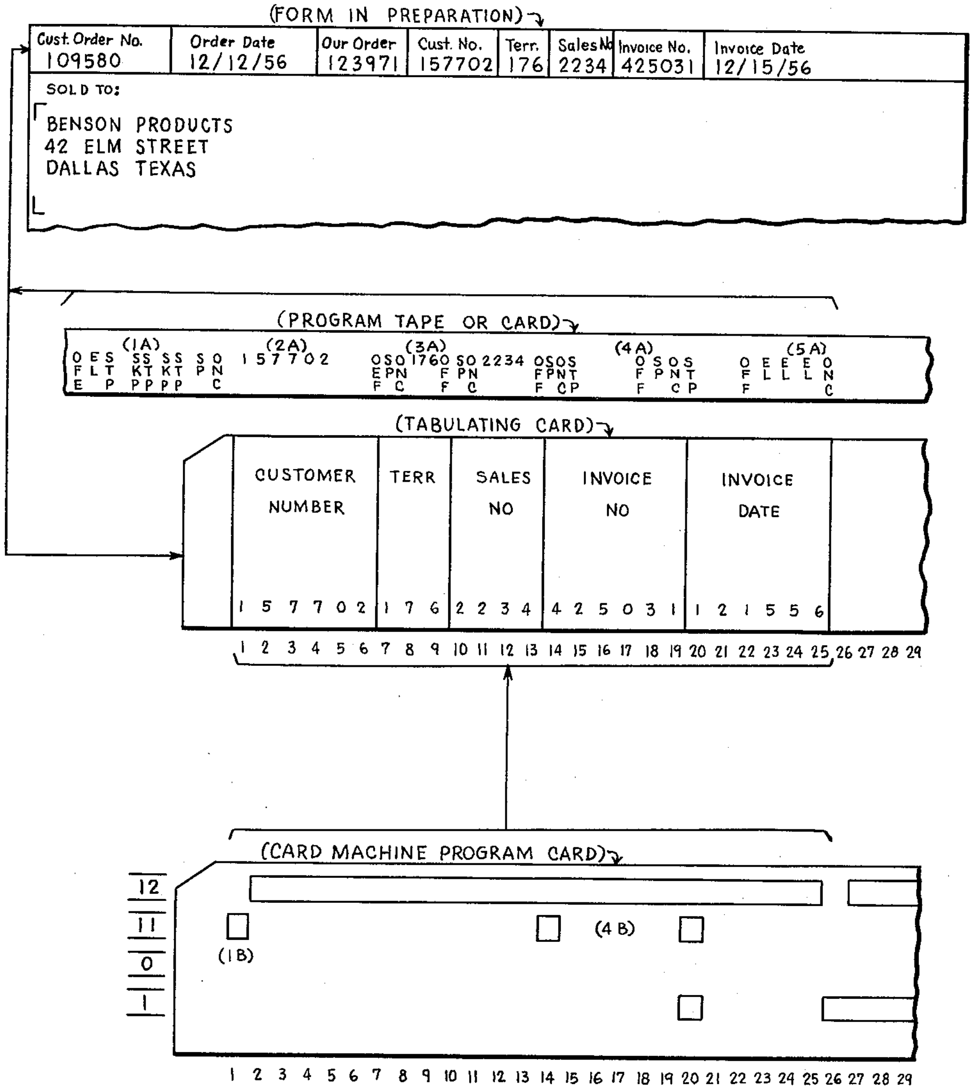
Figure 3B:
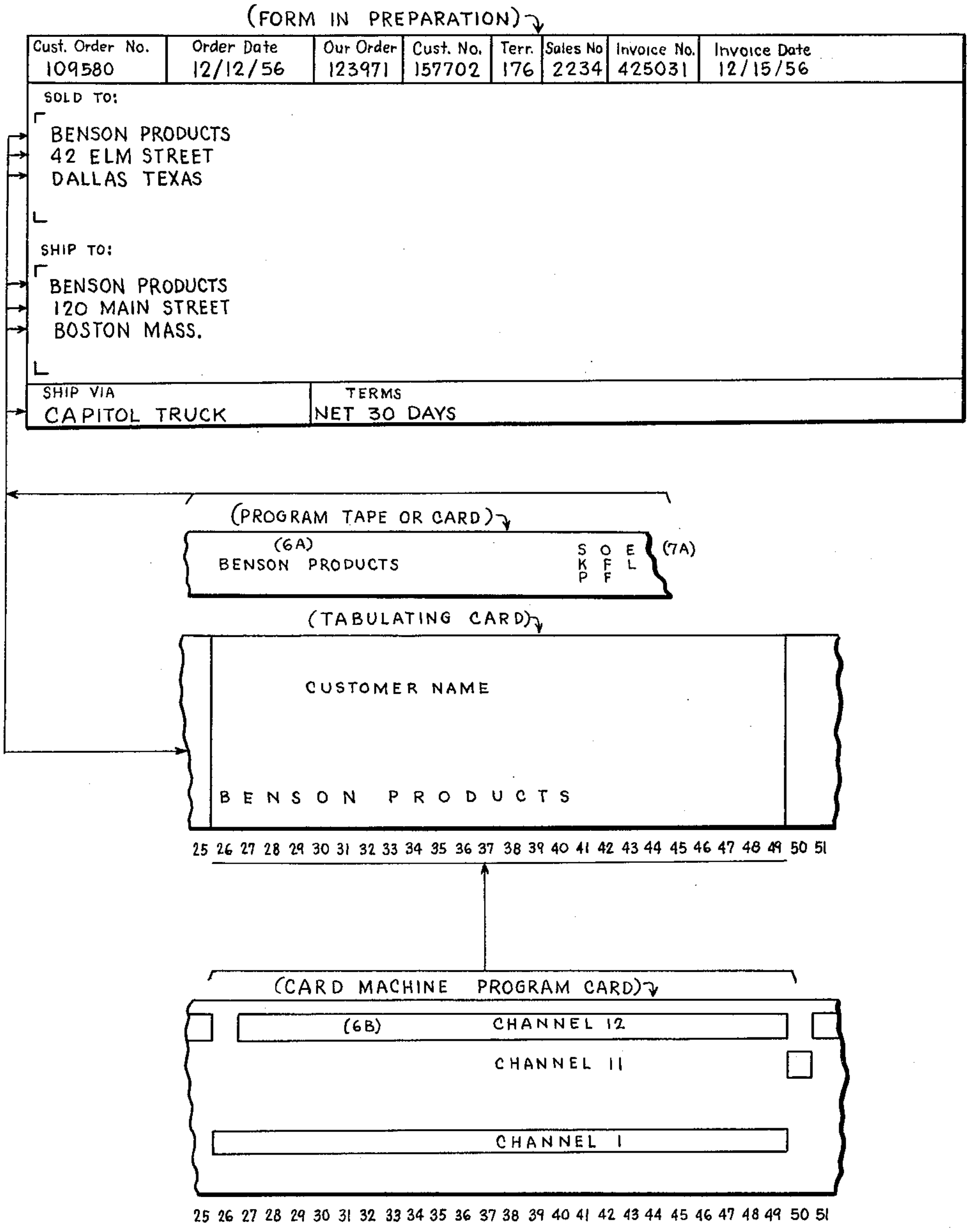
Figure 3C:
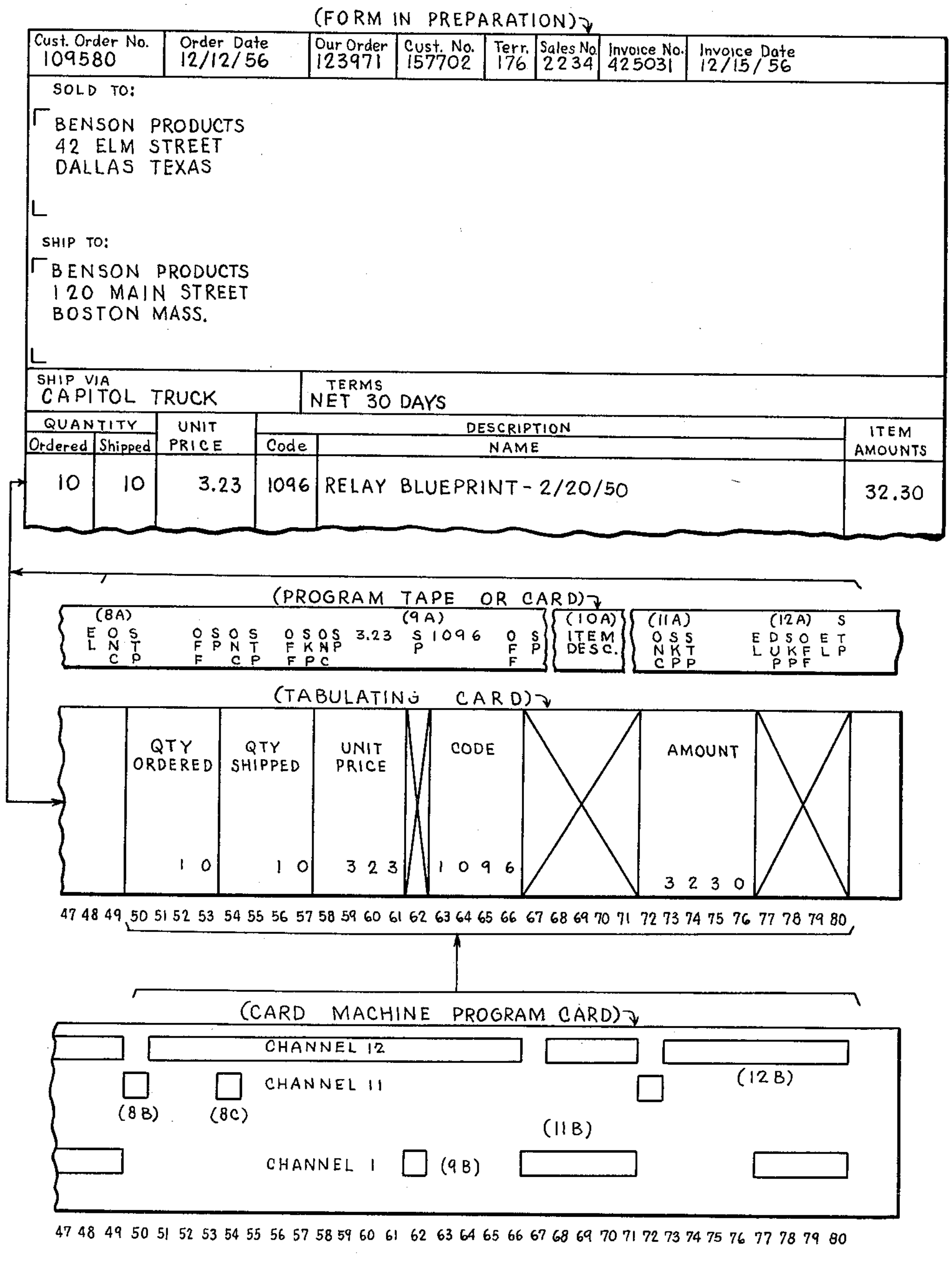
Figure 4A:
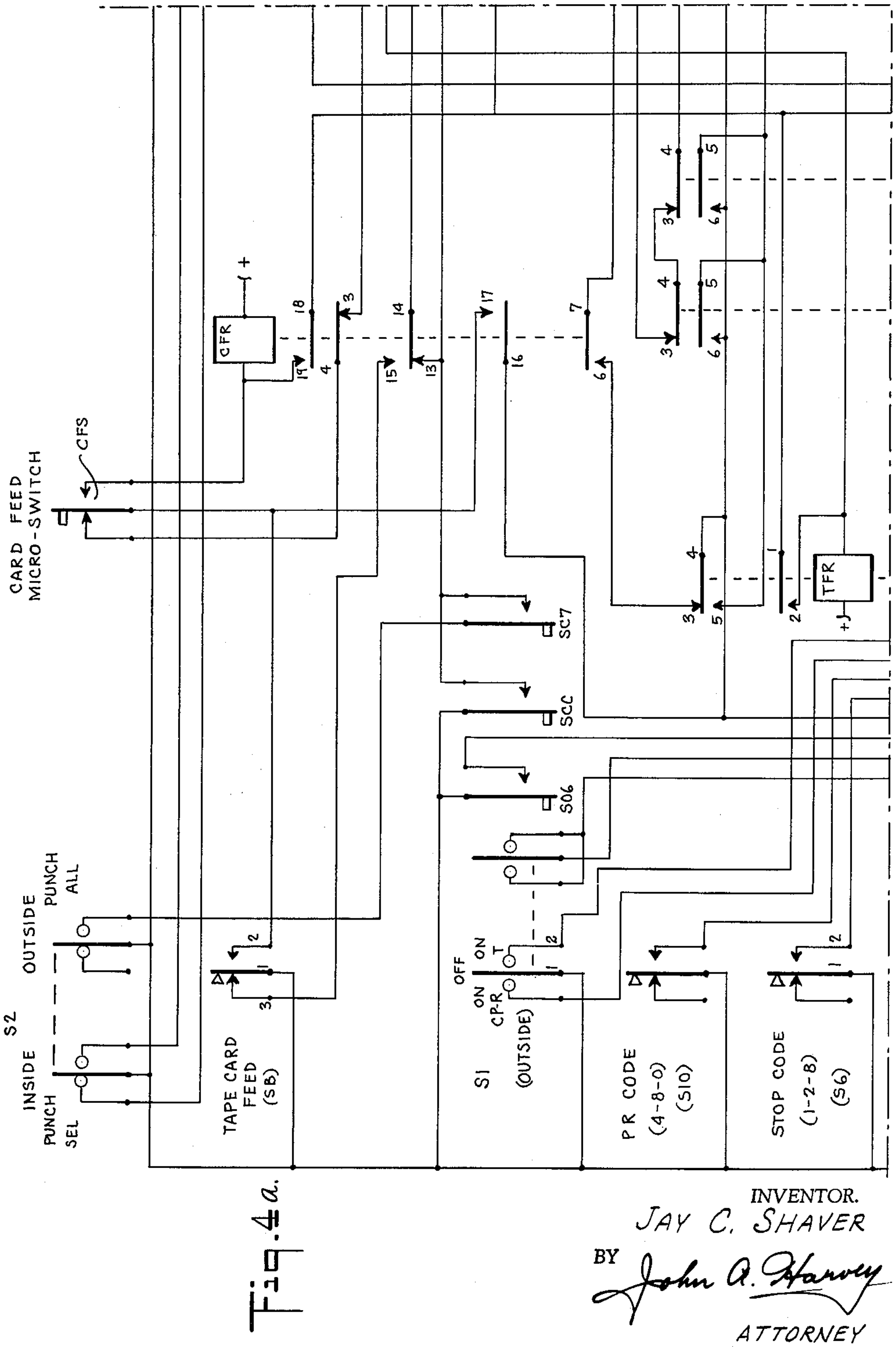
Figure 4B:
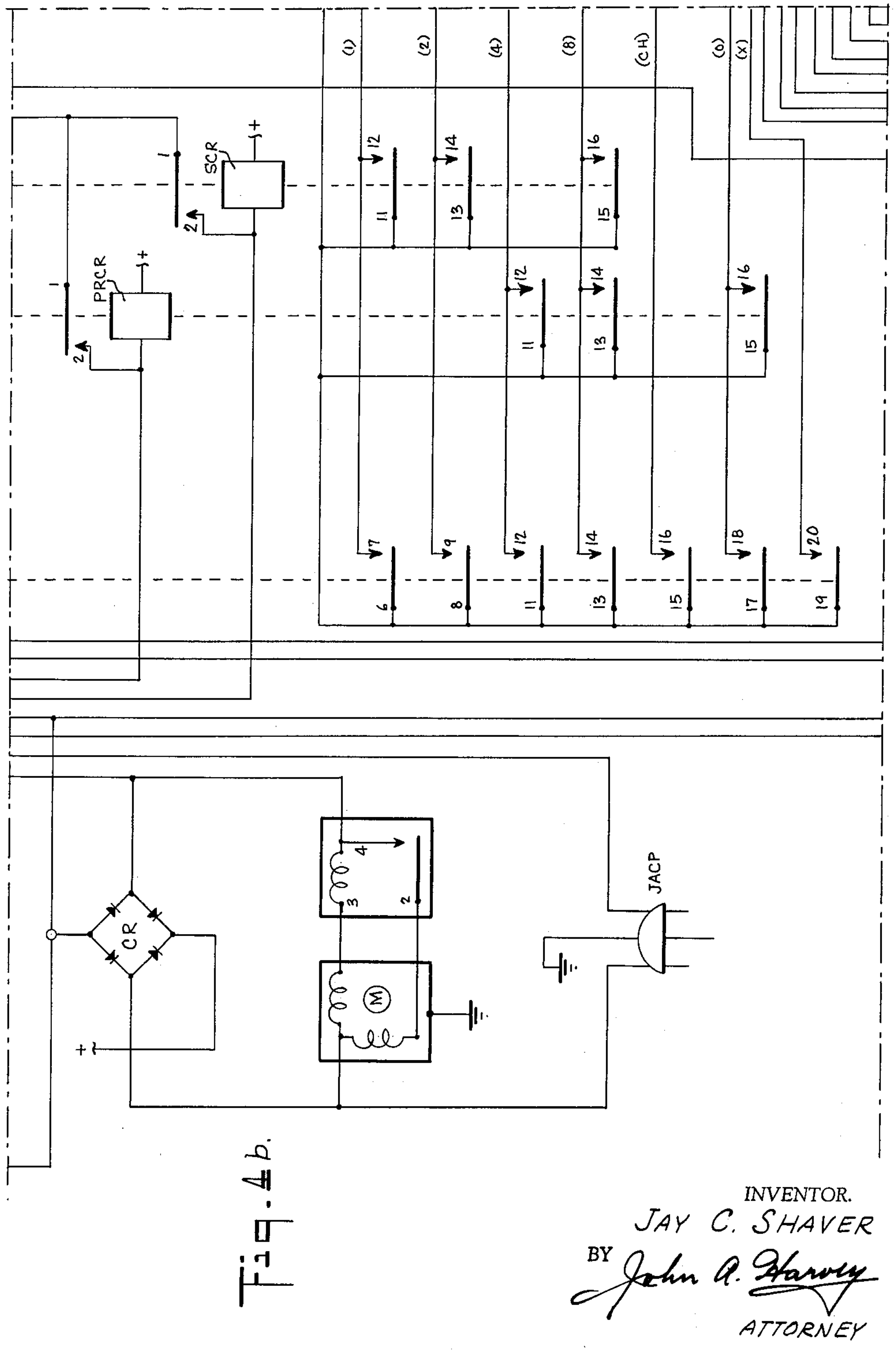
Figure 4C:
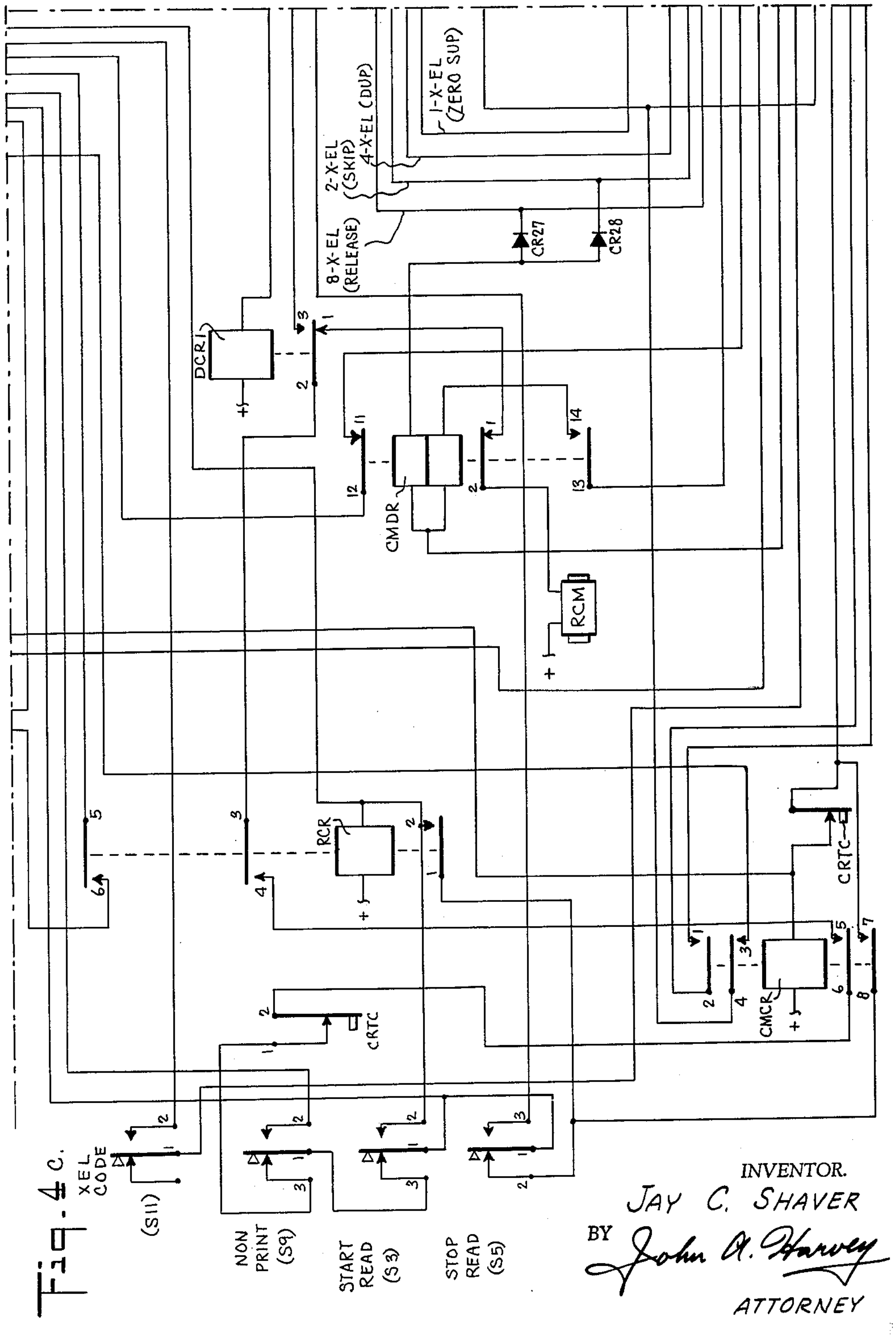
Figure 4D:
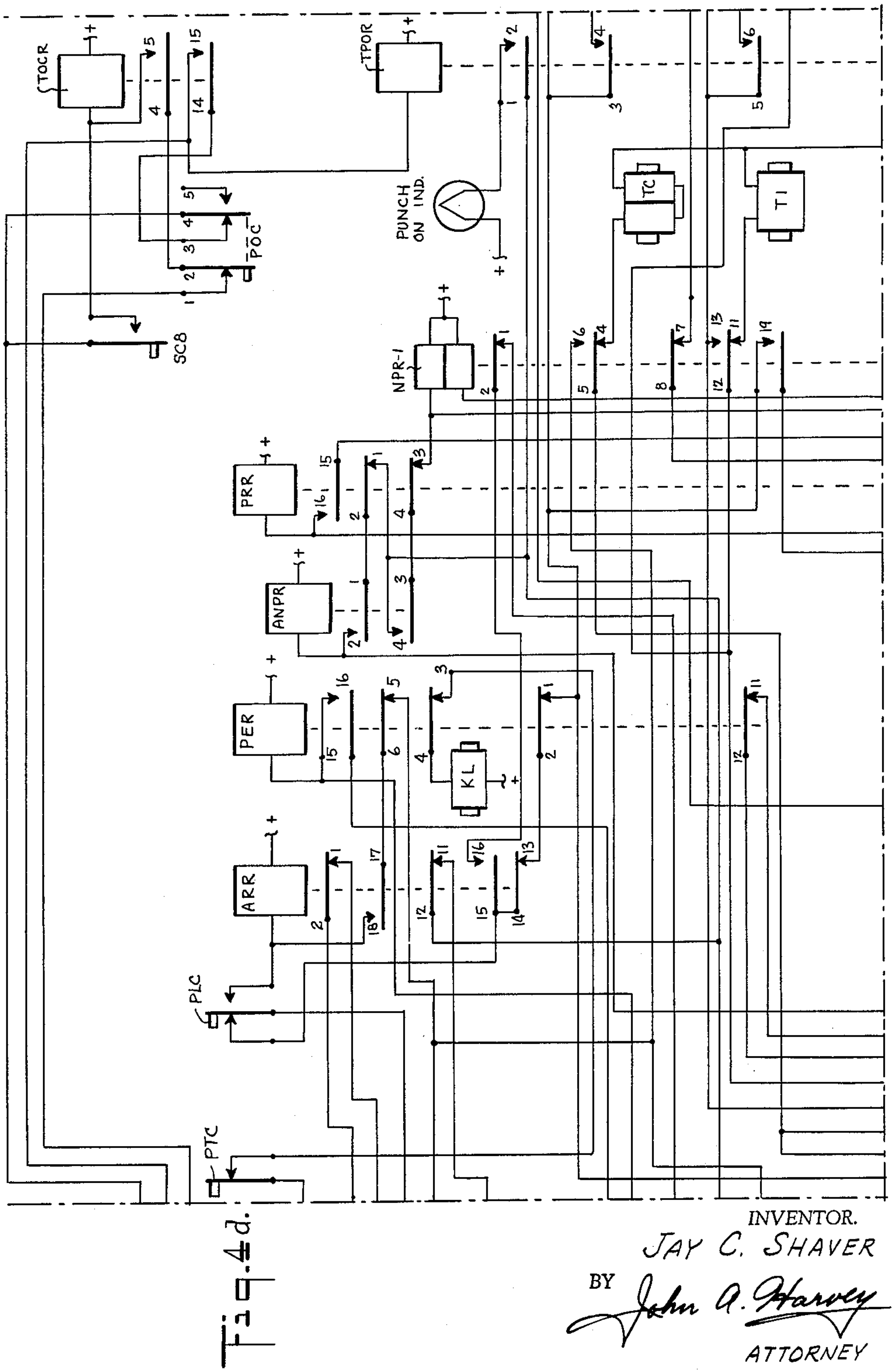
Figure 4E:
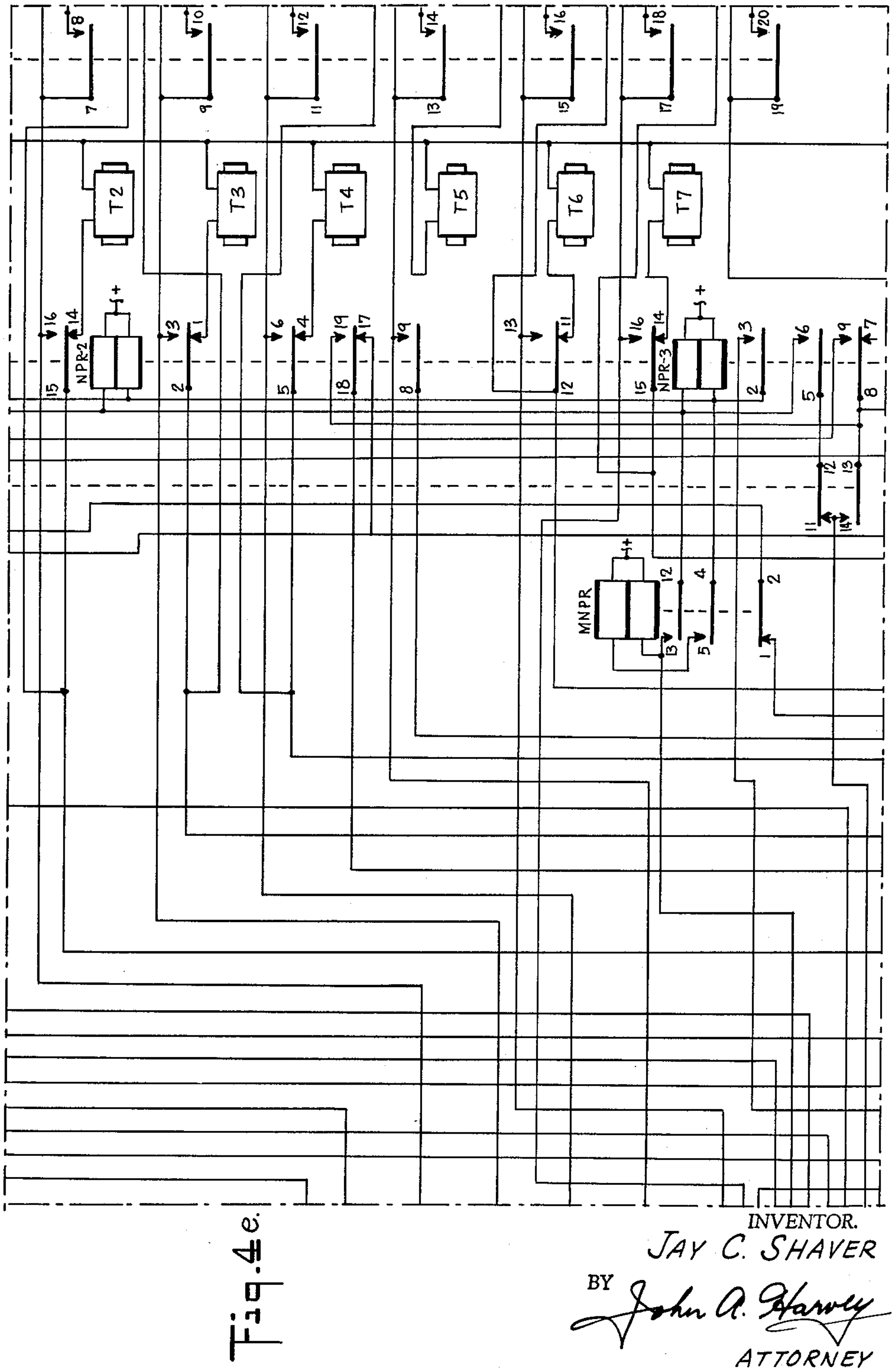
Figure 4F:
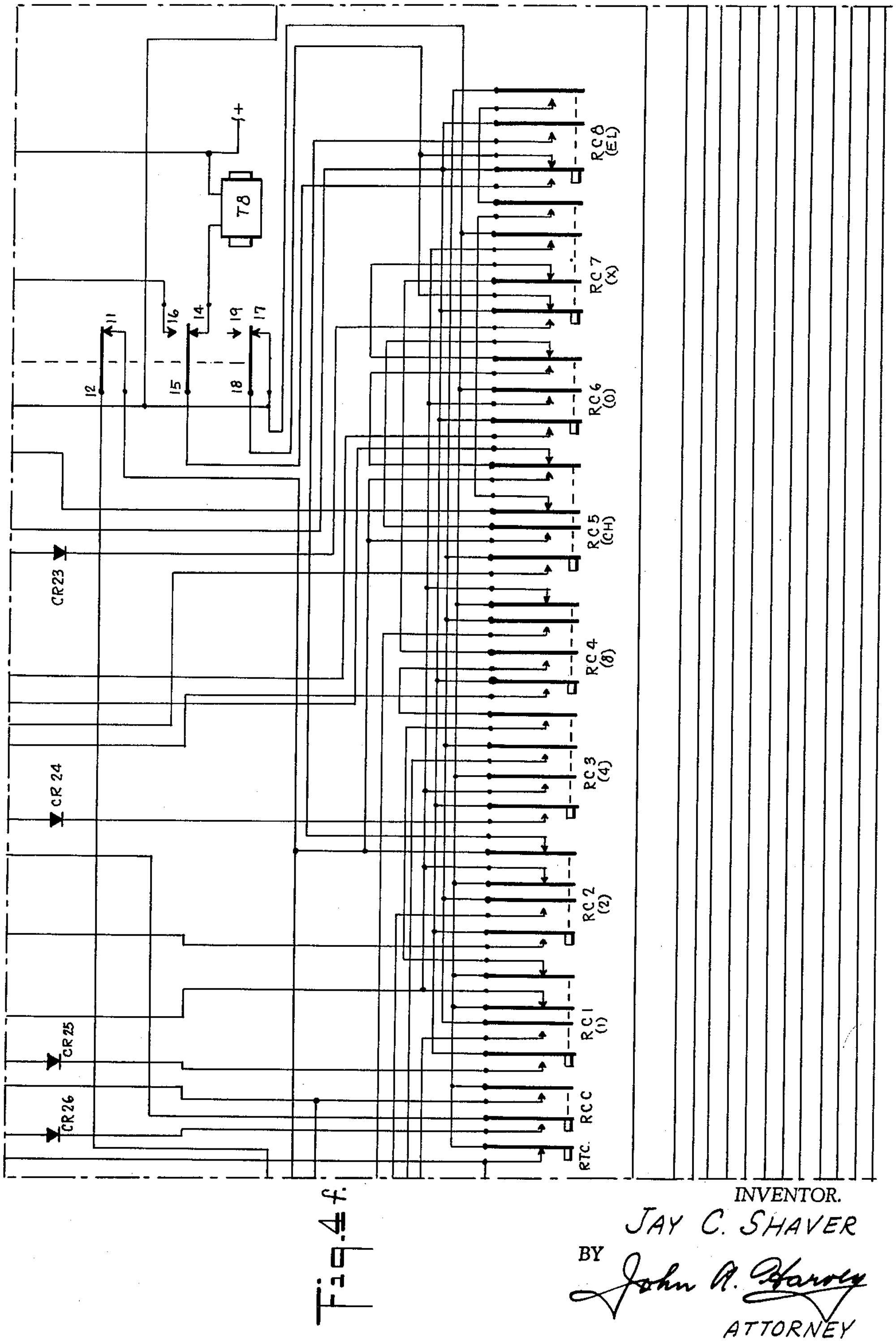
Figure 4H:
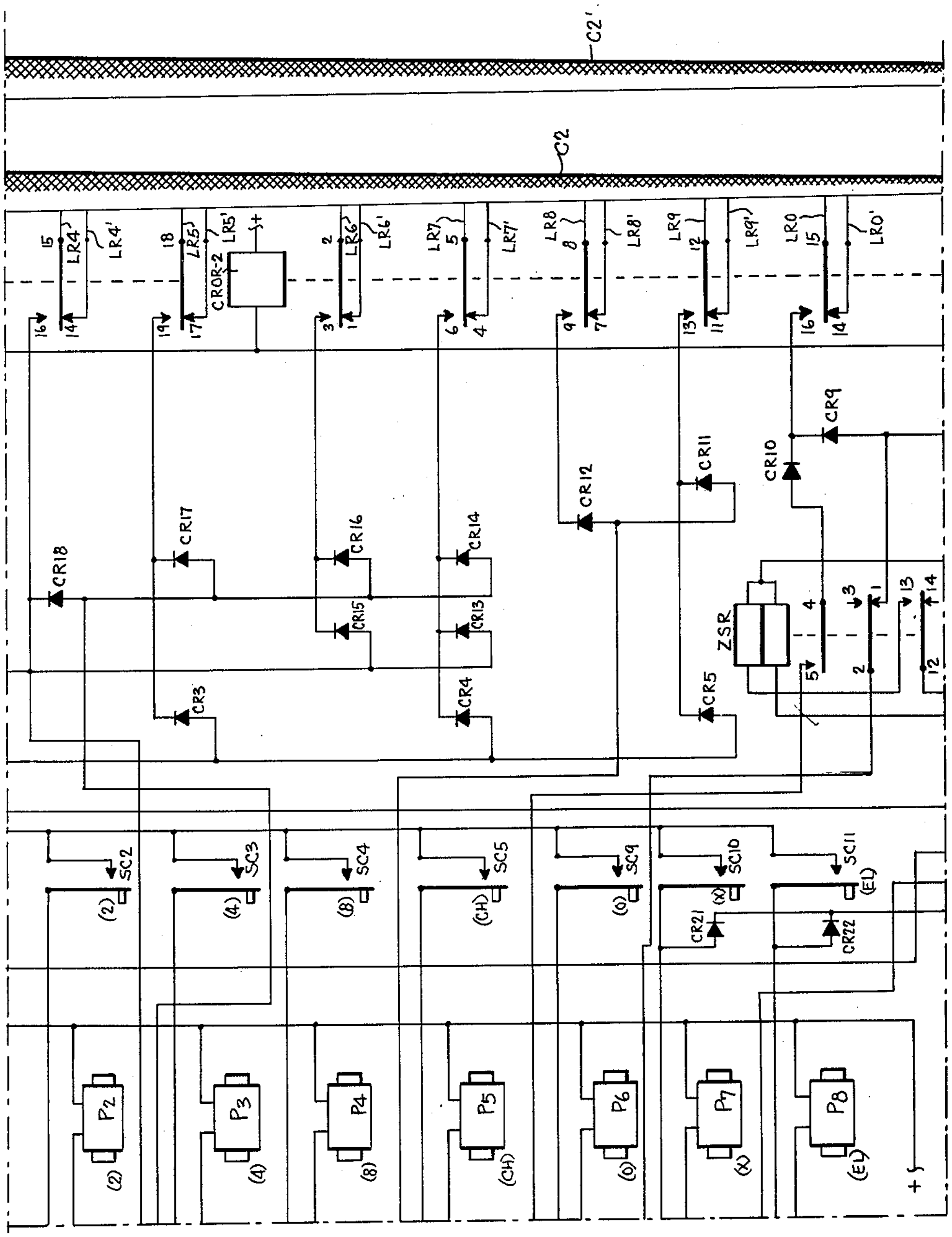
Figure 4I:
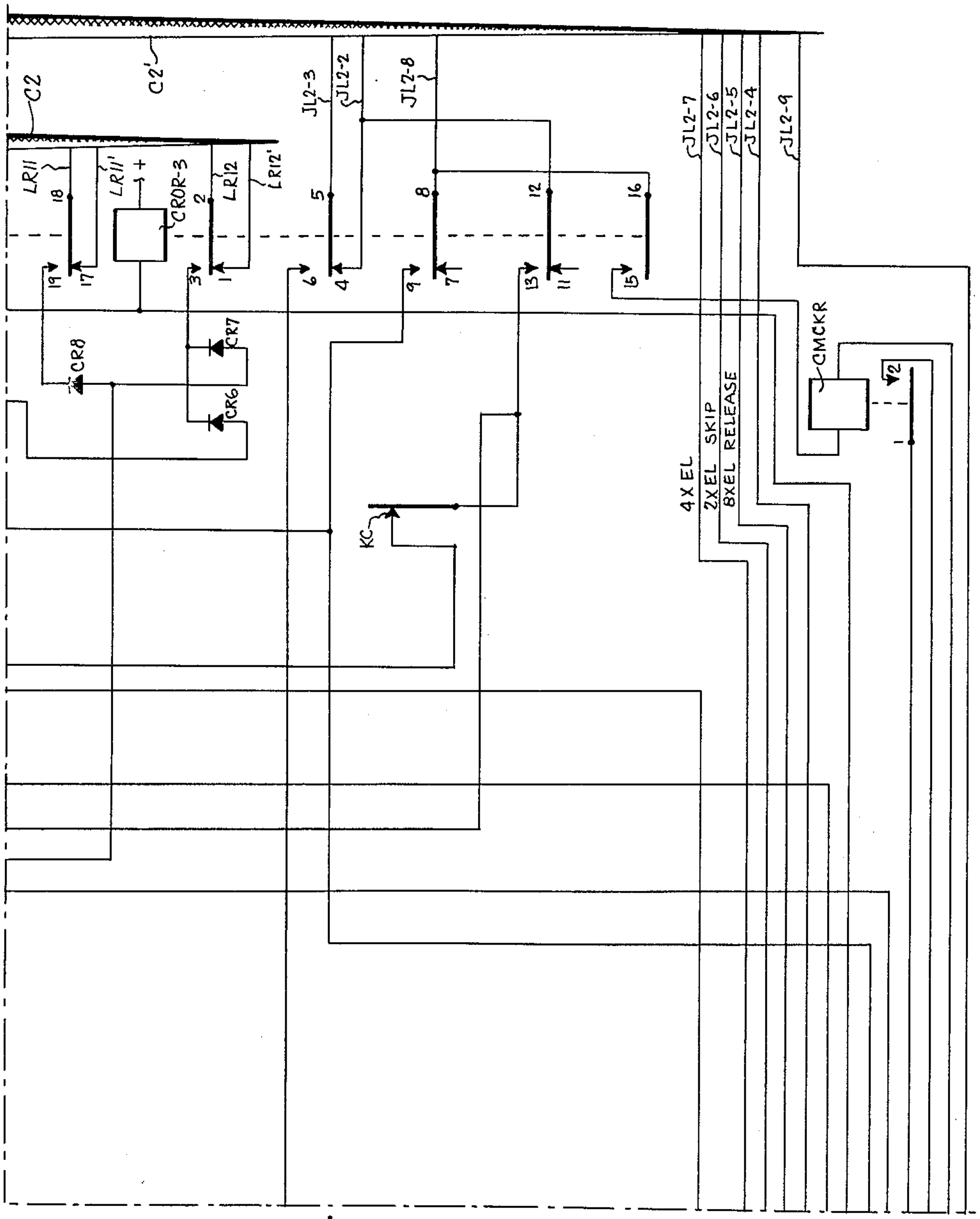

Other objects and advantages of the invention will appear as the detailed description proceeds in the light of the drawings forming a part of this application and in which:

FIGS. 1*a*–1*d* show the electrical control circuit of a typical tabulating card punch-reader unit suitable for use in a record system embodying the present invention, and FIG. 1 indicates the manner in which FIGS. 1*a*–1*d* should be considered together as a unitary structure;

FIGS. 2*a*–2*h* show the electrical circuit arrangement of one form of typewriter for use in the system of the invention, FIG. 2 representing the manner in which FIGS. 2*a*–2*h* should be considered together as a unitary arrangement;

FIGS. 3*a*, 3*b* and 3*c* illustrate one application of the present invention in the preparation of business forms, here shown by way of example as a typical invoice preparation, and are used as an aid in explaining the operation of the record system more fully;

FIGS. 4*a*–4*i* show a circuit diagram of the electrical control system of a second form of typewriter suitable for use in a record system embodying the invention, and FIG. 4 shows the manner in which FIGS. 4*a*–4*i* should be considered together as a unitary structure; and FIG. 5 shows a representative Hollerith code in tabular form.

*General Organization and Operation*

The record system of the present invention combines a conventional form of tabulating card punch-reader machine and a program controlled typewriter with such intercontrol of these units that the program control of the typewriter exercises a general overall operational control of both the typewriter and punch-reader unit. This overall control insures that punched tabulating cards are automatically produced as a direct by-product of a typing operation, and conversely that information selectively read from a succession of punched cards is automatically typed out on a form in preparation.

The program controlled typewriter may have the general construction and operation described and claimed in U.S. Patent No. 2,905,298, granted September 22, 1959 to Edwin O. Blodgett and Wilbur C. Ahrns, and may alternatively use either a program-punched tape or an edge-punched program card as the convenience of a particular application may dictate. A representative type of tabulating card punch-reader machine suitable for use with the present invention is the International Business Machines Corporation Model 024 card punch or Model 026 printing card punch which have constructions and modes of operation illustrated and described in the International Business Machines Corporation publications "Customer Engineering Manual of Instruction—IBM 24 Card Punch, IBM 26 Printing Card Punch" (copyright 1950, 1953) and "Customer Engineering Reference Manual—Preventative Maintenance and Adjustments" (copyright 1952, 1953).

The program control of the typewriter in general effects automatic line spacing, carriage returns, and tabulating operations of the typewriter carriage to positions on the form in preparation at which either variable information may be typed by the typist or invariable information may be supplied by the program tape or card and automatically typed. As this operation proceeds under program control, any information typed either manually or automatically may be selected for automatic punch recording in one or a succession of tabulating cards, or conversely information read from one or a succession of punched cards may be selected by program control and utilized for automatic control of the typewriter operation to type such information on the form in preparation. Any portion or all of the typed information, both that typed manually and that typed automatically, may be punched under manual or program control into a newly punched program (or by-product) tape or card. Information read from a program tape or program card may, under program or manual control, be supplied directly for punch recording in a tabulating card or a newly punched program (or by-product) tape or card without a concurrent typing operation.

An error made during manual typing may be corrected immediately, and correction is accompanied by an automatic rejection of a tabulating card in process of being punched and automatic duplication into a new card of all punch-recorded information preceding the card field in which the error occurred. Each carriage return operation of the typewriter, whether effected manually or by program control, results in an immediate release of a tabulating card being punched and automatic duplication of selected transaction-identifying information (selection being under control of a program card in the tabulating card punch-reader machine) into a successive card. A tabulation operation of the typewriter, whether effected manually or by program control, will cause an automatic skip operation of the tabulating card punch-reader unit whereby one or more fields of the card being punched are skipped over under control of the program card of the latter unit. The typewriter is provided with a duplication key, and actuation of this key either manually or by program control does not effect any typewriter operation but causes duplication of information from a card at the read station of the punch-reader unit into the card at the punch station of this unit. Such duplication is accomplished index-point column by index-point column for each actuation of the duplication key unless the program card of the punch reader unit programs a multi-column duplication in which event each actuation of the duplication key will effect the programmed multi-column duplication of information.

It was earlier explained that information is recorded in successive fields of the tabulating card. The beginning of each such field is identified by the program card of the punch-reader machine which, like the tabulating card, has columns of index points corresponding in number to those of the tabulating card and which moves automatically past a program-reading station index-point column by index-point column in synchronism with the same movement of tabulating cards past the punch and read stations of the machine. Each character spacing operation of the typewriter automatically effects a corresponding index-point column movement of the program card and the tabulating cards in the punch-reader machine. Thus certain print positions in each line of printed copy of the typewriter correspond to the beginning of a corresponding field of the tabulating card. This relationship is used in conjunction with interlocking controls between the typewriter and punch-reader unit to assure that the card being punched remains in step with the typing of the form in preparation, and provides an automatic check for any malfunctioning of either the typewriter or punch-reader unit as well as indicating failure of an operator to type the correct number of digits corresponding to the digit width of a given numeric card field. Such malfunctioning or operator error is immediately indicated by lock up of the keyboard of the typewriter and cessation of all operations until the fault has been manually corrected.

Additional interlocking controls between the typewriter and the punch-reader machine are such as to insure that when selected for operation the punch-reader unit is turned On before operation of the typewriter can be initiated, and further that cards have been correctly positioned in the punch and reader stations of the punch-reader unit to insure correct recording operations of the latter. These general interlock controls further require that the punch-reader machine shall have a properly positioned program card inserted in place and with the program reading station properly conditioned to read the card; otherwise operations of the typewriter and reader-punch unit are prevented. These general interlock controls also terminate operation of the system in the event that the punch-reader machine should exhaust its supply of unpunched cards.

*Card Punch-Reader Machine Electrical Control Circuit*

The electrical control circuit of a typical tabulating card punch-reader unit is shown in FIGS. 1*a*–1*d* which should be considered as a unitary structure as indicated in FIG. 1. This machine has provision for feeding cards from a supply hopper in succession through the machine to an output hopper. During punching operations, the input hopper is supplied with blank cards which are then fed through a punch station where the cards may be punched as desired index-point-column by index-point-column. Upon completion of the punching operation, the newly punched card moves automatically to the reading station while a blank card moves automatically into the punching station. During automatic duplicating operations, the card at the reading station is moved automatically index-point-column by index-point-column through the station and information read from the card automatically controls the operation of the punching station to duplicate all or selected information read at the reading station in to the new card at the punching station. When this automatic duplicating operation is completed, additional information is then punched under typewriter control into the card at the punching station, and when the punching operation is completed this card also moves to the reading station whil ethe card formerly at the reading station is moved automatically to the output card hopper and a new card automatically moves into position in the punching station.

Since the normal operation of the machine requires a card to be positioned at both the reading and punching stations, the machine is initially placed in operation by two manual card-feed operations accomplished as follows. Manual actuation of a release key RK (FIG. 1*d*) directly energizes the release relay 1 which thereupon closes its contacts 1BU to apply, through normally closed contacts 3BL of a relay 3, a potential to the control electrode of a tube V1 to render the latter conductive. The tube V1 thereupon energizes a skip relay 25, which closes its contacts 25–4 to apply to the control electrode of a vacuum tube V2 the same potential which is applied to the control electrode of the vacuum tube V1. This renders the vacuum tube V2 conductive and energizes an escape magnet EM. The escape magnet EM causes one index-point-column card feed to occur before the punching station operates by energization of a punch clutch in a manner presently to be considered. The relay 1 holds through its contacts 1AL and the program cam contact 2, thus causing the skip magnet 25 and escape magnet EM to continue to be energized through successive index-point columns of a tabulating card passing through the punching station. It was earlier explained that the program card of the punch-reader unit moves in synchronism with movement of a card through the punching station, and a column-by-column card feed accordingly continues until the program cam contact 2 transfers at column No. 88 of the program card. This transfer of the program cam contact 2 deenergizes the release relay 1, thus deenergizing the vacuum tubes V1 and V2 and their associated skip relay 25 and escape magnet EM, and energizes a card feed clutch CFC through a normally closed autofeed switch CS1. All of the foregoing operating sequences take place even though there is as yet no card in the punch station.

A card-feed cam CF3 closes at 70° of the card-feed cycle thus initiated, and would normally energize a card lever relay 3 through a card lever switch CLS except for the fact that the latter contacts close as the first card moves during the feed cycle from the card supply hopper into a position where it may then feed into the punching station but this card movement occurs so late in the card feed cycle that the card lever switch CLS does not close until after the card-feed cam contacts CF3 open again at 150° of the card cycle. This first card-feed cycle thus places a card in position in readiness to feed into the punching station.

A further manual actuation of the release key RK repeats the previously described operation, but now the card lever switch CLS is closed at the time the card-feed cam contacts CF3 close at 70° of the second card feed cycle so that the card lever relay 3 is energized to close its contacts 3BL. This relay holds through a hold winding and its contacts 3AL and the program cam contacts 2. Its contacts 3BL transfer to apply a potential to the control electrode of a vacuum tube V3 to render the latter conductive and energize a keyboard restore magnet KR. Energization of this magnet releases any key that can be manually actuated and which upon actuation is latched in actuated position. The relay contacts 3BU, which initially enabled a manually actuable feed key FK to energize the card-feed clutch CFC, now transfer to a position where the latter circuit is no longer energized and new automatic control circuits presently to be considered are energized. The result of the two foregoing described feed operations is to position a card in the punch station and to move a second card into position in readiness for subsequent feed into the punch station. If card punching operations are now to be performed, they progress in a manner presently to be described. If card reading operations only are to be performed as the cards move through the punch-reader unit, a following card-feed operation takes place in a manner hereinafter to be described in order that the card which now stands in the punching station shall be transferred on to the reading station.

Figure 1B:
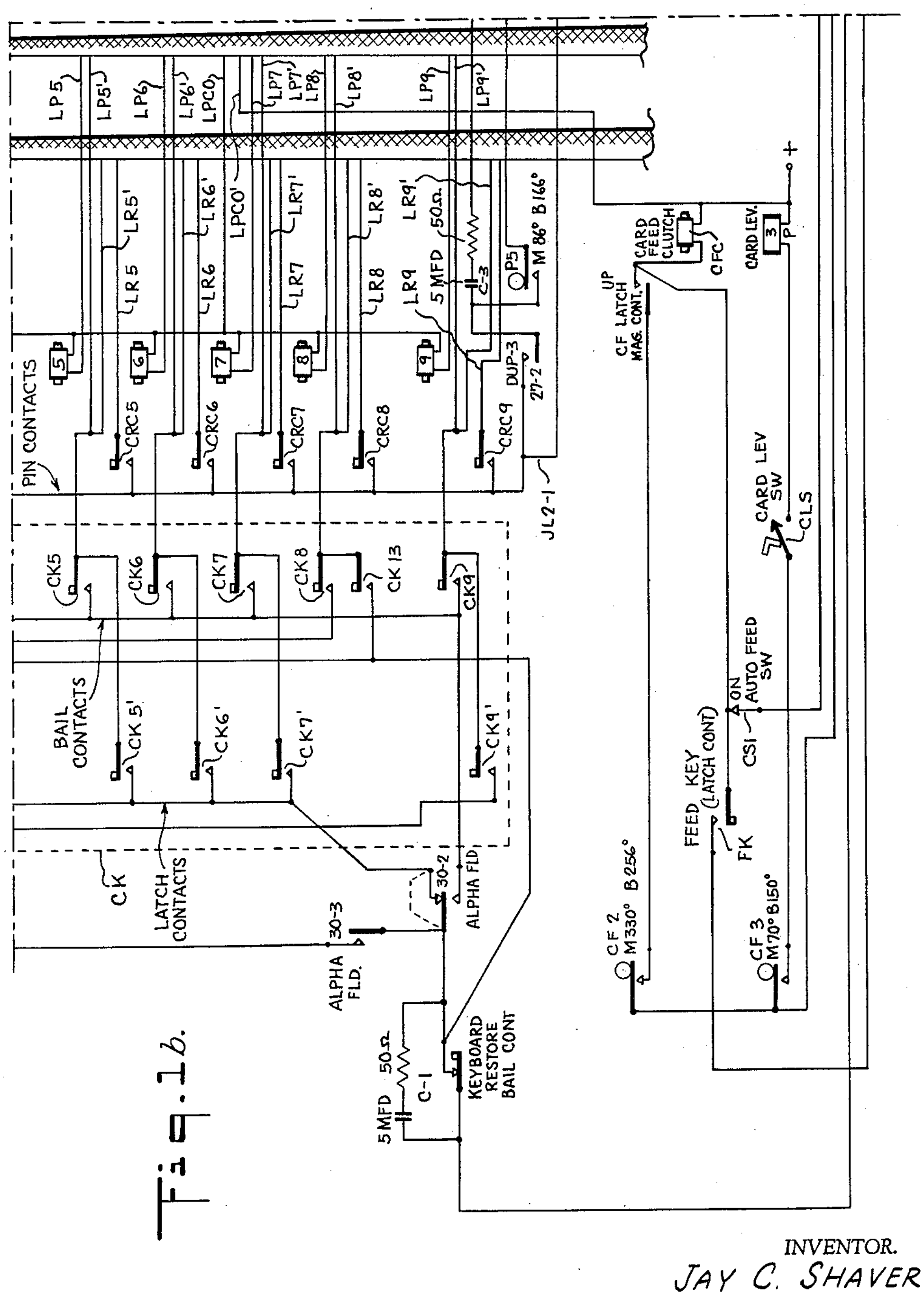
Figure 1C:
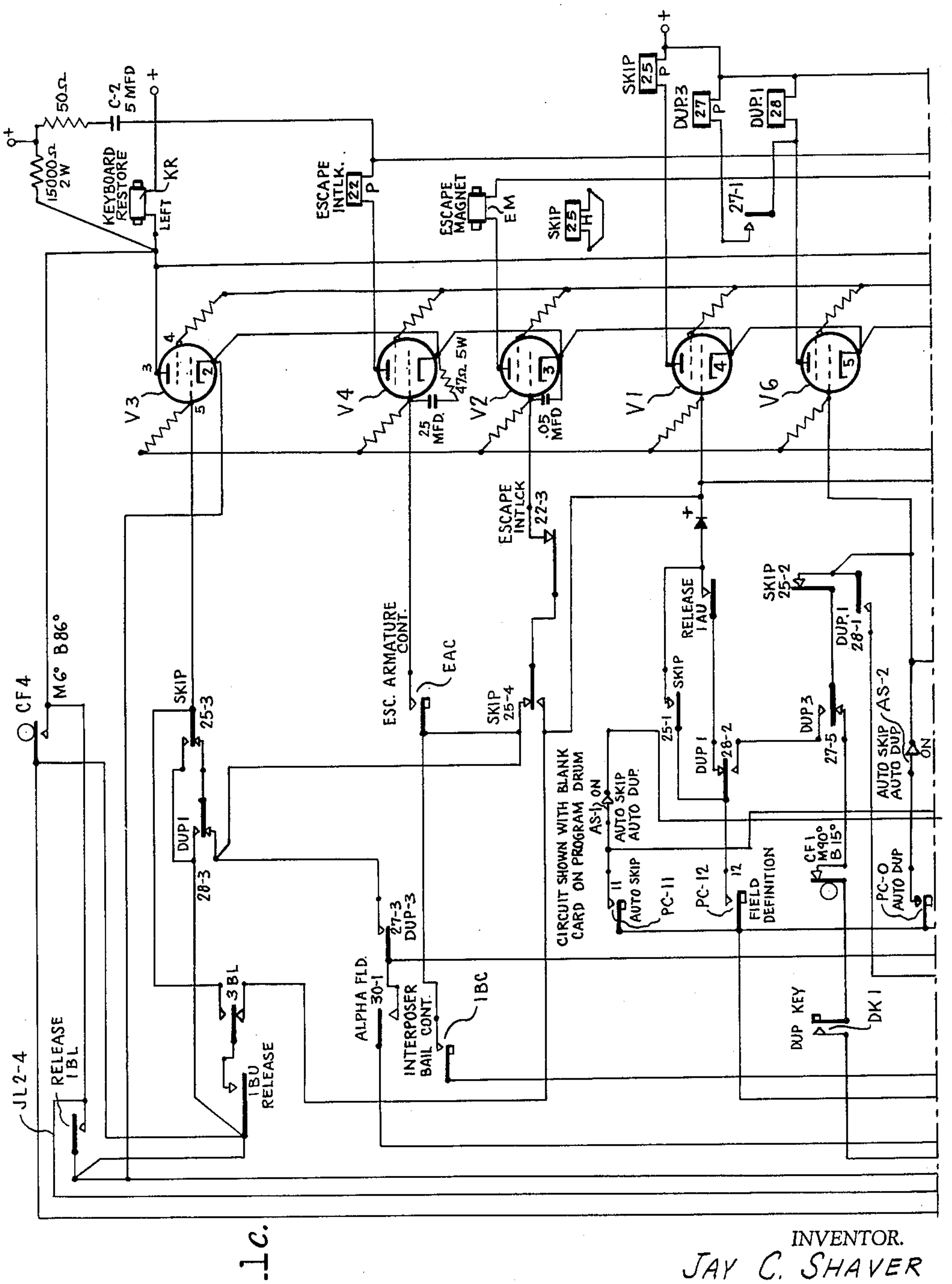
Figure 1D:
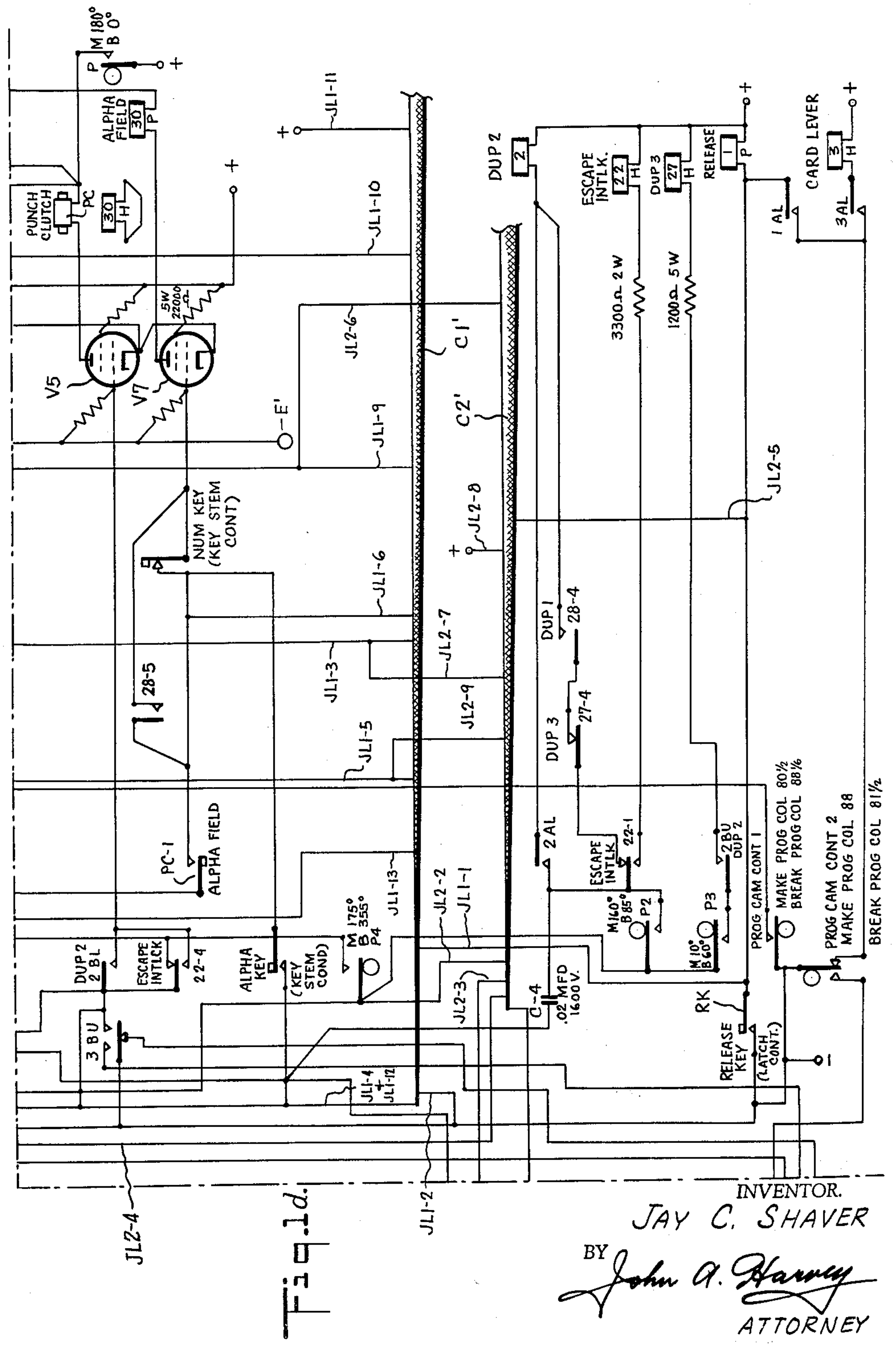

The punching of information into a blank card in the punching station occurs index-point-column by index-point-column under control of a plurality of punch magnets identified in FIGS. 1*a* and 1*b* by the reference numerals 0–9, 11 and 12. Punching operations may proceed under several types of control. As previously mentioned and as will subsequently be described in detail, punching may be under control of an associated typewriter, which is itself either manually actuated or actuated by information read from a punched program tape or card. When information is to be duplicated from a card read at the reading station, the punch magnets of the punch station are controlled by reading contacts CRC1–CRC12 which are actuated through a cycle of operation in response to energization of the punch clutch magnet PC. Information may also be punched into a blank card by manual actuation of a combinational keyboard CK having multiple contacts CK1–CK15 and CK1′ and CK9′, and contacts identified as "Space No. 1," "Dash Skip," "Zero," and "*." These latter contacts are actuated in various combinations by manually actuable keys in conformity with the Hollerith code shown in the table of FIG. 5.

Energization of any of the punch magnets 0–12 or the space magnet causes interposer bail contacts IBC (FIG. 1*c*) to close and energize the vacuum tube V2 and escape magnet EM through normally closed skip relay contacts 25–4 and escape interlock relay contacts 22–3. This energization of the escape magnet EM provides a one-column feed of the card through the punching station, which occurs before the energization of the punch clutch magnet as earlier mentioned, and also causes escape armature contacts EAC to close so that the interposer bail contacts IBC now also energize a vacuum tube V4 in turn to energize an escape interlock relay 22. The contacts 22–4 of the escape interlock relay 22 transfer to energize a vacuum tube V5 which in turn energizes the punch clutch magnet PC thereby to perform a punching operation in one column of the card in the punch station. The escape interlock relay 22 holds through its holding winding, its contacts 22–1, and the punch cam contact P2 to 85° of the punch cycle. As soon as the punching cycle has started, punch cam contacts P1 open to deenergize the vacuum tubes V2, V4 and V5 and thereby deenergize the escape magnet EM, the pick up coil of the escape interlock relay 22, and the punch clutch magnet PC.

In the machine herein described, the 11th row of index points of the program card used in the punch-reader unit is punched to effect a skip of one index-point column, and skipping continues over a number of columns if desired by punching successive index points of the 12th index-point row of the program card. A pair of contacts PC–11 are closed by each punched index point of the 11th row of the program card, and a pair of contacts PC–12 are closed by each punched index point of the 12th row of the program card. When the contacts PC–11 close, they energize the vacuum tube V1 through a manually operable switch AS–1 (which is closed whenever the punch-reader unit is operated from the combinational keyboard CK rather than from the associated typewriter) and thereby effect energization of the skip relay 25. The contacts 25–1 of the latter relay connect the vacuum tube V1 to the program card contacts PC–12, which accordingly maintain the vacuum tube V–1 energized for each successive index point which is punched in the 12th row of the program card. After the 80th column of a card is punched or skilled at the punching station, the program cam contact No. 1 closes as the card moves from column 80 (the last column of the card) to what might be considered for convenience as a column 81. The closing of these program cam contacts energizes the vacuum tube V1 and thereby the skip relay 25, and concurrently energizes the vacuum tube V2 and escape magnet EM through the transferred contacts 25–4 of skip magnet 25, and there ensues an automatic continuous skip of eight column spaces until the program cam contacts No. 1 again open. This eight-space skip is such as to move the program card to its index-point column 1 where it is ready to repeat its programmed control of the machine operation. A program cam contact No. 2 transfers its contacts at which might conveniently be considered column 88 of the program card (actually column 1 of the latter) and in doing so initiates a card feed operation if the autofeed switch CS1 is closed for normal card feed operations. This places a new card in the punching and reading stations of the machine as earlier described.

It was earlier mentioned that information read at the reading station may be automatically duplicated into a blank card in the punching station. This may be manually accomplished by manually actuating a duplicate key DK1 (FIG. 1*c*) which thereupon energizes a vacuum tube V6 through the normally closed card feed cam 1 contacts CF1, the normally closed contacts 27–5 of the duplicate 3 relay 27, and the normally closed contacts 25–2 of the skip relay 25. The vacuum tube V6 energizes the duplicate 1 relay 28 which closes its contacts 28–4 to energize a duplicate 2 relay 2 through the normally closed contacts 27–4 of a duplicate 3 relay 27, the normally closed contacts 22–1 of escape interlock relay 22 and the normally closed punch cam contacts P2. The duplicate 2 relay 2 holds through its contacts 2AL and the punch cam contacts P2. The punch clutch magnet PC is energized for one punch cycle through the normally open contacts 2BL of the duplicate 2 relay 2, and a duplicate 3 relay 27 is thereupon energized through the normally open contacts 2BU of the relay 2 and punch cam actuated contacts P3 which close at 10° of the punch cycle. The duplicate 3 relay 27 holds through its contacts 27–1 with the duplicate 1 relay 28 so long as the vacuum tube V6 is maintained energized by the fact that program card contacts PC–12 remain closed by a succession of punched index points in the 12th row of the program card. The energizing circuit last mentioned may be traced from the control electrode of tube V6 through the normally closed contacts 25–2 of the skip relay 25, the now transferred contacts 27–5 of the duplicate 3 relay 27, and the now transferred contacts 28–2 of the duplicate 1 relay 28 to the contacts PC–12. Thus a duplication operation manually initiated by the duplication key DK1 continues as long as 12th row holes are successively punched in the program card.

The duplication operation last described may also be initiated automatically by holes punched in the zero row of index points of the program card. Each such hole causes the automatic duplication contacts PC–0 to close and thereby energize the vacuum tube V6 to initiate a duplication operation in the same manner as just described in connection with manual actuation of the duplication key DK1. As in the case of a duplication operation manually initiated, the duplication continues through successive index-point columns under control of successive index-point punching of the 12th index-point row of the program card to actuate the 12th row contacts PC–12.

Alphabetic fields of the tabulating card often contain blank or unpunched index-point columns to provide spacings beetween two or more words of the field. In order that duplication may extend over these blank columns, the program card is punched in the first row of index points throughout each such alphabetic field. Each such punched index point causes the alphabetic field contacts PC–1 to close and thus energize a vacuum tube V7 to energize an alphabetic-field relay 30. The contacts 30–1 of the latter relay now close to energize the vacuum tube V2 and associated escape magnet EM through normally closed contacts 25–4 of the skip relay 25 and the contacts 27–3 of the duplicate 3 relay 27 which is closed during each duplication operation. This produces a one column movement of the tabulating card through the punch station in the same manner as earlier described with respect to the energization of the vacuum tube V2 through the contacts 25–4 of the skip relay 25 and the interposed bail contacts IBC. This spacing movement of the tabulating card occurs, however, without accompanying punch magnet energization since the blank column read for duplication at the reading station is void of any information.

*Electrical Control System for Typewriter Used With Tabulating Card Punch*

One form of typewriter utilizing the present invention is connected to the tabulating card punch-reader unit by the cables C1 and C1′ (shown in FIGS. 1*a*, 1*b* and 1*d*) and includes an electrical control system as shown in FIGS. 2*a*–2*h* which should be considered together as a unitary structure as indicated in FIG. 2. The typewriter construction and its electrical control system are, with certain differences hereinafter noted, essentially similar to those disclosed and claimed in the above-mentioned U.S. Patent No. 2,905,298. Reference should be made to the latter for a detailed description of the typewriter construction and operation, and such features of construction and operation as are common to that disclosed in this patent and to a typewriter utilizing the present invention are only briefly described here as necessary to enable an understanding of the invention.

The immediately following description of the typewriter control system will assume that the tabulating card punch-reader machine is turned off so that it does not apply a negative potential to the conductor JL1–2 nor a positive potential to the conductor JL1–11 of the interconnecting cable C1′. As a result, a card machine check relay CMCKR shown in FIG. 2*a* of the typewriter control system remains deenergized. The typewriter itself is turned on by manual actuation of an on-off switch S1 to close its contacts 1 and 2 and associated contacts 1′ and 2′. The contacts 1′ and 2′ effect supply of power to a rectifier CR and to the typewriter motor M. The contacts 1 and 2 of the switch S1 energize a card machine control relay CMCR through the normally closed contacts 3 and 4 of a tabulating card punch-on control relay TCPOCR. The card machine control relay CMCR remains thus energized as long as the on-off switch S1 remains in this position, and the contacts 11 and 12 of this relay open to prevent energization of the card machine check relay CMCKR even though the tabulating card punch-reader unit should be turned on at that time or some later time. The contacts 1 and 2 of a card machine control relay CMCR apply energization through contacts SPT, which are closed when a supply of blank tape or a blank card is positioned in the local punch unit associated with the typewriter in readiness for punching, and the normally closed contacts 1 and 2 of a punch error relay PER to a keyboard lock-up magnet KL. The latter upon becoming thus energized unlocks the keyboard of the typewriter. The contacts 3 and 4 of the card machine control relay CMCR close to enable energization of a reader control magnet RCM, which when energized places into operation a reader unit associated with the typewriter and having the function of reading a program tape or card providing automatic programmed control of the typewriter operation. Contacts 5 and 6 of the card machine control relay CMCR provide a hold circuit for this relay which is of no significance at this time. The contacts 15 and 16 of the card machine control relay CMCR close to permit energization of a reader control relay RCR when a start relay switch S3 is manually actuated to close its contacts 1 and 2.

The reader control relay RCR upon becoming energized as last mentioned holds through its contacts 1 and 2, the contacts 3 and 4 of the punch error relay PER, the contacts 1 and 2 of an error relay ERR, any unactuated one of a plurality of reader contacts SR1, SR2, and SR4 and a stop read switch 25.

Figure 2A:
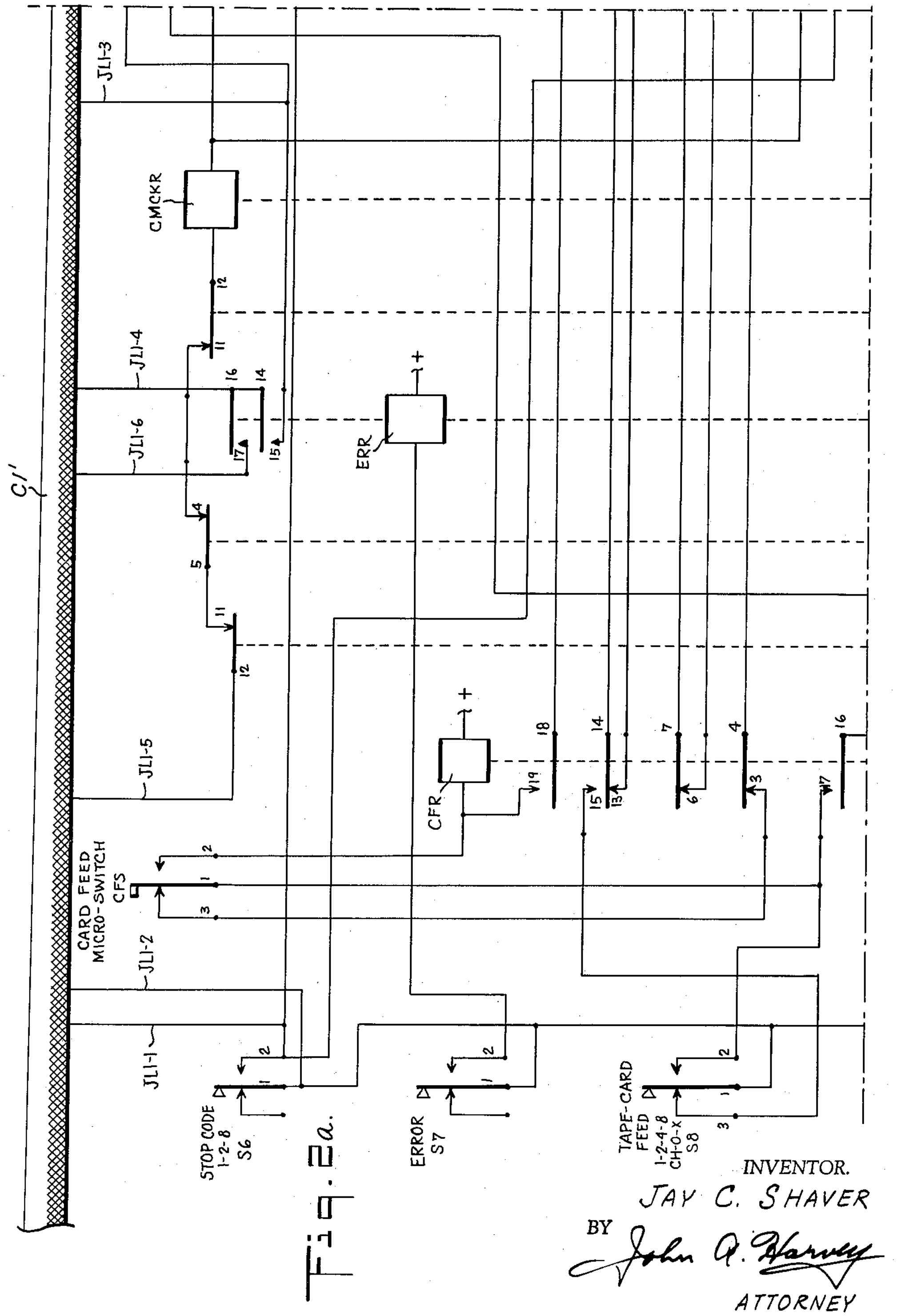
Figure 2B:
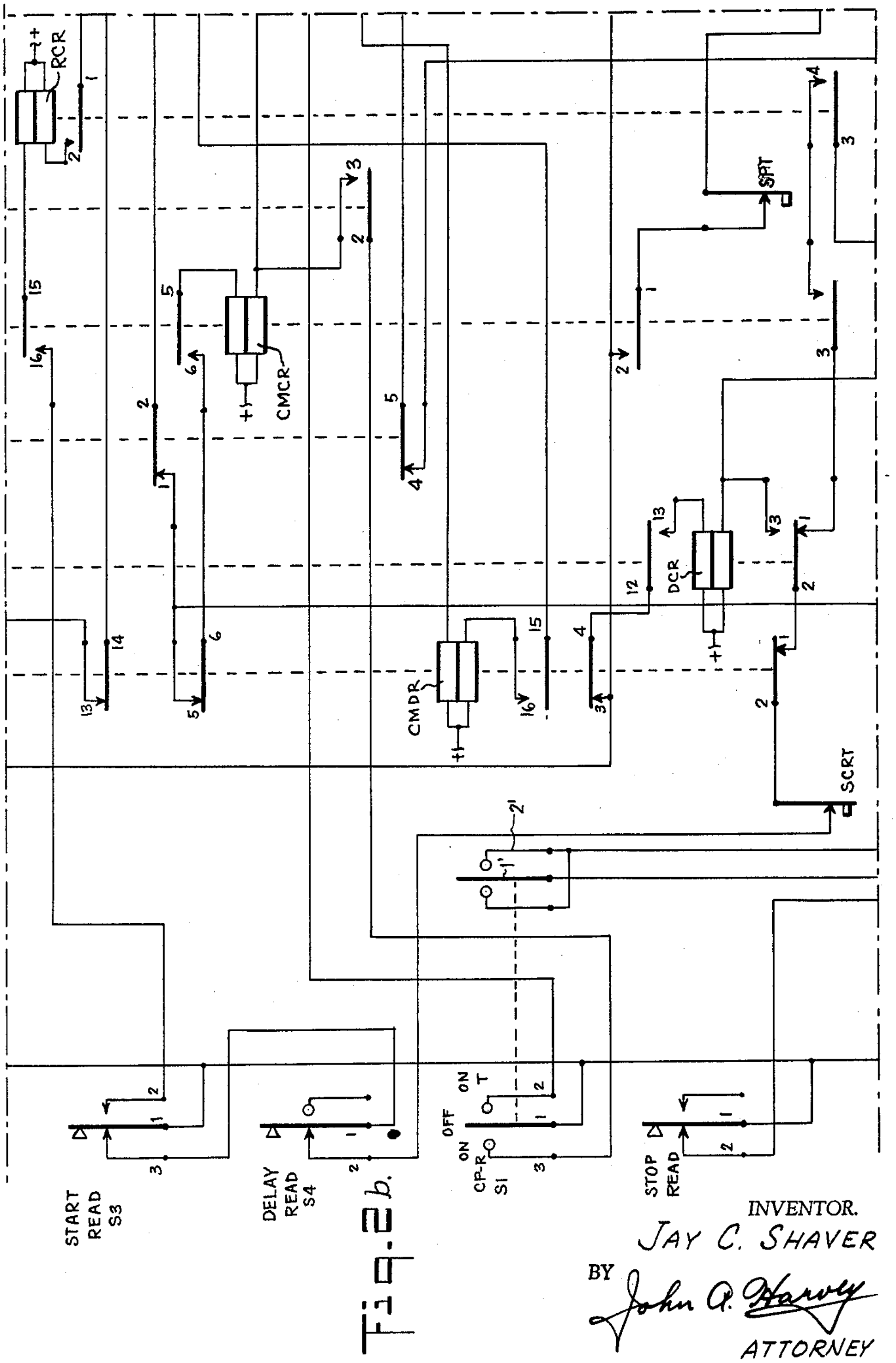
Figure 2C:
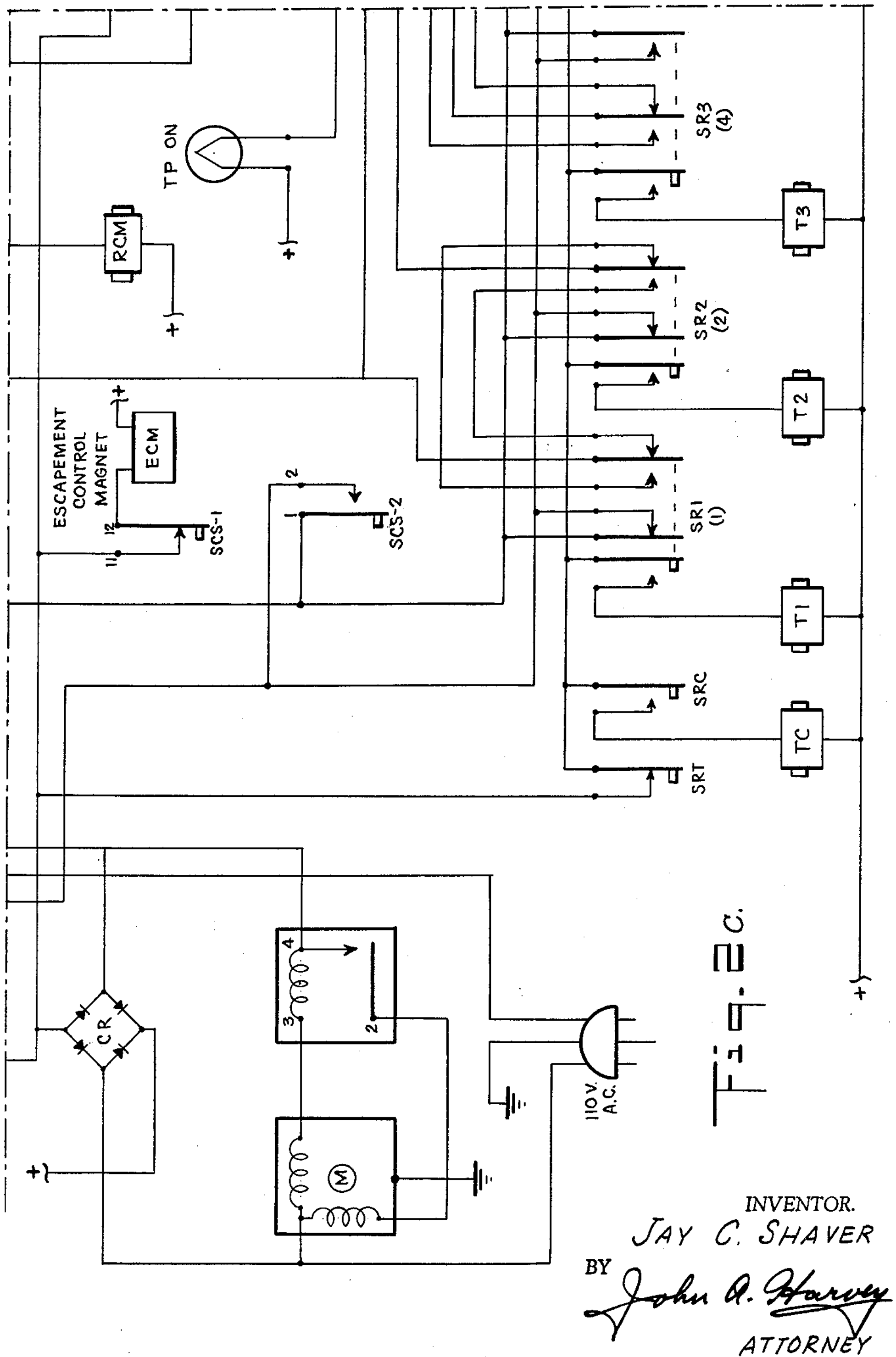
Figure 2D:
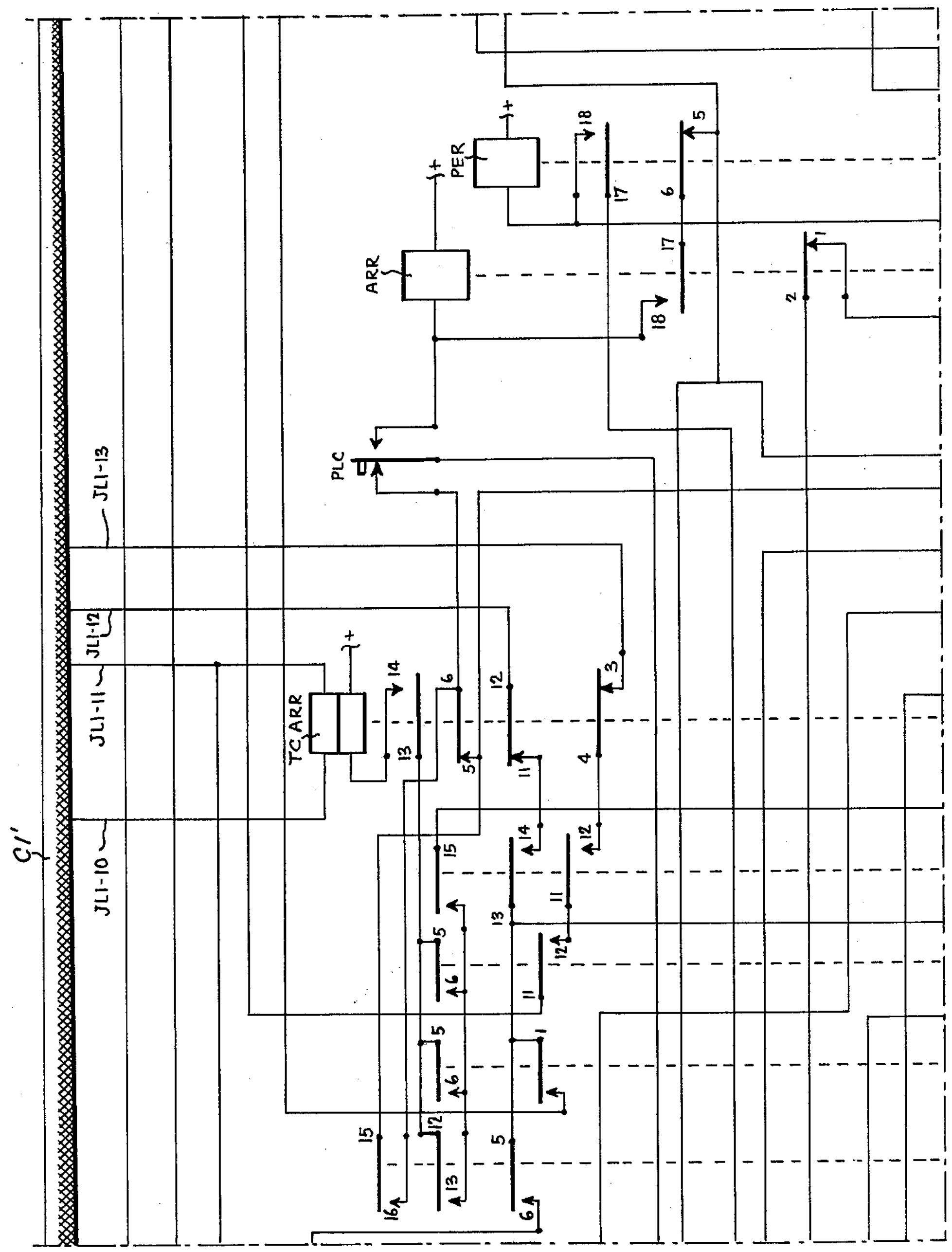

If a blank tape or card is positioned in the local punch unit associated with the typewriter, the tape or card may be fed through the punch unit by manual actuation of a tape-card feed switch S8 to close its contacts 1 and 2. If a blank tape is positioned in the punch unit at this time, a cardfeed microswitch CFS closes its contacts 1 and 2 and the manual actuation of the tape-card feed switch S8 energizes a tape-feed relay TFR (FIG. 2a). This energizing circuit may be traced from the latter relay through the normally closed contacts 1 and 2 of a tape anti-repeat relay TARR, normally closed contacts 3 and 4 of a card-feed relay CFR and the contacts 1 and 2 of the card feed microswitch CFS to the switch S8. As explained more fully in the aforementioned Blodgett et al. patent, the tape-feed relay TFR upon becoming energized punches a delete code 1—2—4—8—CH—O—X in the tape and continues to do so as long as the tape-card feed switch S8 remains manually actuated. If on the other hand a blank card is positioned in the punch unit associated with the typewriter, the card-feed microswitch CFS is actuated by the card to close its contacts 1 and 3 so that the manual actuation of the tape-card feed switch S8 now energizes a card feed relay CFR. The delete code for a card is a blank (no punch) code, so that the card feed relay CFR upon becoming energized holds through its contacts 16 and 17 and merely advances the card through the local punch until an aperture provided at the end of a card permits the micro-switch CSF to transfer and thereby open its contacts 1 and 3.

Assuming that a program tape or card is positioned in the reader unit associated with the typewriter in preparation for a typing operation, typing is normally initiated under program control by actuation of the start-read switch S3 to close its contacts 1 and 2 and thus energize the reader control relay RCR which is held by a hold circuit previously described. Upon release of the start-read switch S3 to close its contacts 1 and 3, the reader control magnet RCM is energized through the now closed contacts 3 and 4 of the reader control relay RCR, the now closed contacts 3 and 4 of the card machine control relay CMCR, the normally closed contacts 1 and 2 of a delay control relay DCR, the normally closed contacts 1 and 2 of a card machine delay CMDR, the normally closed contacts SCRT which open only during a carriage return or tabulating operation of the typewriter, the normally closed contacts 1 and 2 of a delay read switch S4 and the now closed contacts 1 and 3 of the start-read switch S3. Energization of the reader control magnet RCM initiates operation of the program reader unit associated with the typewriter, and information read from the program tape or card causes actuation of the reader contacts SR1–SR8 and reader common contact SRC in accordance with various combinations of code holes punched in the program tape or card.

The reader contacts SR1–SR8 and SRC are energized through contacts SRT, which are closed when a program tape or card is positioned in the reader unit in readiness to be read, and in turn energizes various ones and various combinations of the code translator magnets T1–T8 and the translator clutch magnet TC of the typewriter to effect automatic functional control and character print operation of the typewriter. Information read from the program tape may thus be typed on the form in preparation, and the form otherwise positioned by functional control in preparation for manual typing. This automatic program control of the typewriter continues until a stop code 1—2—8 is read, at which time the reader contacts SR1, SR2 and SR8 interrupt the previously described hold circuit for the reader control relay RCR. Upon becoming thus deenergized, the contacts 3 and 4 of the reader control relay RCR open to deenergize the reader control magnet RCM and thus interrupt operation of the program reader unit of the typewriter.

The automatic operation of the typewriter under control of a program tape read by the reader unit may also be manually terminated temporarily by manual actuation of a delay read switch S4, which is included in the energizing circuit of the reader control magnet RCM and thus effects deenergization of the latter as long as the delay read switch S4 remains manually actuated. Normal automatic operation resumes when the delay read switch S4 is released to close its contacts 1 and 2 again. Automatic programmed operation of the typewriter may also be terminated by manual operation of the stop read switch S5 to open its contacts 1 and 2 and thus interrupt the previously described hold circuit of the reader control relay RCR to deenergize this relay and thereby deenergize the reader control magnet RCM. In such event, the start read switch S3 must subsequently be manually actuated to reenergize the reader control magnet RCR.

The typewriter includes a manually actuable stop code switch S6 which when manually actuated to close its contacts 1 and 2 energizes a stop code relay SCR to punch a stop code 1—2—8 into the tape or card moving through the local punch unit of the typewriter.

An error switch S7 of the typewriter may also be manually actuated to close its contacts 1 and 2 and thereby energize an error relay ERR. The contacts 1 and 2 of this relay open to interrupt the hold circuit of the reader control relay RCR and thereby deenergize the latter, and this in turn deenergizes the reader control magnet RCM and terminates the operation of the program reader unit. Energization of the error relay ERR also performs other functions hereinafter to be considered in reference to the typewriter controlled operation of the tabulating card punch-reader machine.

As in the arrangement of the above-mentioned Blodgett et al. patent, an anti-repeat relay ARR is energized each punch cycle through a punch latch contact PLC and a code selector common contact SSC. In the event that the operation of the typewriter is so speeded up that the local punch unit does not complete a cycle of its operation before the next operation of the typewriter occurs again to actuate the selector common contact SSC, the punch error relay PER is energized through the normally closed contacts 3 and 4 of the stop code relay SCR, the now closed contacts 15 and 16 of the anti-repeat relay ARR, the normally closed contacts 5 and 6 of a tabulating card anti-repeat relay TCARR, the punch latch contacts returning to normally closed position, the contacts 13 and 14 of the card feed relay CFR, and the selector common contacts SSC now closed a second time. The relay PER upon picking up establishes a hold circuit through its contacts 17 and 18, the normally closed contacts 6 and 7 of the card feed relay CFR and the normally closed contacts 3 and 4 of the tape feed relay TFR. The contacts 5 and 6 of the punch error relay PER interrupt the hold circuit of the anti-repeat relay ARR, its contacts 11 and 12 interrupt the normal energizing circuit for the punch clutch magnet PC, and its contacts 1 and 2 deenergize the key lock magnet KL to lock up the keyboard of the typewriter. The hold circuit of the punch error relay is interrupted by manual actuation of the tape-card feed switch S8 to energize either the card feed relay CFR (to open its contacts 6 and 7) or the tape feed relay TFR (to open its contacts 3 and 4).

Also as in the aforementioned Blodgett et al. patent, the present typewriter includes a delay control relay DCR which is energized by each end-of-line (carriage return) actuation of the reader contact SR8 upon reading a carriage return code of the program tape. It is the purpose of the delay control relay to terminate the energization of the reader control magnet RCM, and thus the operation of the program reader unit, for a short interval sufficient to enable the carriage to return to the left-hand margin of the document in preparation. It does this by opening its contacts 1 and 2, which are included in the energizing circuit of the reader control magnet RCM. The delay control relay DCR is provided with two hold circuits. One of these extends through its contacts 12 and 13 and the normally closed contacts 3 and 4 of a card machine delay relay CMDR. This hold circuit has significance only in connection with the card machine operation later to be described, and for purposes of the present description, it may merely be noted that the card machine delay relay CMDR is energized (to interrupt this hold circuit) under control of an end-of-line relay ELR energized by contacts SEL which are closed by the carriage return operation of the typewriter. This second hold circuit for the delay control relay DCR, and the one most significant to the present discussion, extends through its contacts 2 and 3 and the carriage return and tabulation contact SCRT, the delay read switch S4 and the start read switch S3 and this hold circuit maintains the relay DCR energized until the contacts SCRT open at the completion of the carriage return operation. This causes the delay control relay DCR to drop out and restore the energizing circuit of the read control magnet RCM. The delay control relay DCR is also picked up by a tabulation (or skip) code 2—4—8—CH—O read from the program tape, and effects a delay in the same manner as just described but with the difference that a relay SKR is energized by skip contacts SKP and in turn energizes the card machine delay relay CMDR to open at its contacts 3 and 4 one hold circuit for the delay control relay DCR.

A punch select switch S2 (FIG. 2*f*) may be manually actuated to its "punch all" position where its contacts 1 and 2 are closed to energize a tape-punch-on relay TPOR. This relay when thus energized connects the local punch clutch magnet PC and punch magnets P1–P8 through various diode rectifiers CR1–CR19 to various ones of the code selector contacts SS1–SS12, SSC, SSB, alphabetic word contacts E, V, N, Z, R and I and numeric word contacts 5 and 9 as shown. The contacts last mentioned are operated in various combinations in accordance with the Hollerith 12-bit code to identify each numeric and alphabetic character necessary to duplicate the information printed by the typewrtier, and the diode rectifiers CR1–CR19 convert this Hollerith code form to an 8-bit code form for actuation of the punch magnets P1–P8 of the typewriter punch unit. Thus with the punch selector switch S2 in its "punch all" position to energize the tape-punch-on relay TPOR, the punch unit records all character and functional control information necessary to duplicate the printed copy of the form in preparation in the typewriter. Manual actuation of the punch selection switch to its "select" position to close its contacts 1 and 3 effects energization of the tape-punch-on relay TPOR only when a tape-on control relay TOCR is energized to close its contacts 3 and 4. The latter relay is energized by a select punch-on contact SPO actuated by a "tape-punch-on" key lever of the typewriter, its energizing circuit extending through contacts 13 and 14 of a type basket shift contact SCS to prevent energization of the relay TOCR whenever the type basket is in its "upper case" position. The tape-punch-on control relay TOCR holds through its contacts 1 and 2 and either the contacts 3 and 4 of a punch-off contact POC (actuated by a "punch-off" key lever of the typewrtier) or the contacts 3 and 4 of the case shift contact SCS. Thus the tape-punch-on control relay TOCR when once energized continues to remain energized as long as the type basket is shifted to its "upper case" position even though the punch-off key lever is actuated to actuate the punch-off contacts POC. When the tape-punch-on relay TPOR is thus energized by the tape-punch-on control relay TOCR, the former holds through its contacts 19 and 20 and the contacts 5 and 6 of the latter relay and thus remains energized so long as the latter relay itself is energized. It will be apparent from this that the relays TOCR and TPOR when once picked up by actuation of the tape-punch-on contact SSB are thereafter deenergized only with the type basket in its "lower case" position to open the contacts 3 and 4 of the case shift contacts SCS and upon actuation of the punch-off contacts POC in response to actuation of the "punch-off" key lever of the typewriter.

The typewriter herein described has no characters provided on the key levers in their "upper case" position so that this position of the type basket provides non-print operation of the typewriter. The escapement control magnet ECM of the typewriter when energized permits escapement action of the typewriter carriage, and is energized through a case shift contact SCS–1 so that the typewriter does not space during non-print operation. A case shift contact SCS–2 bypasses the normally closed stop-read elements of the reader contacts SR1, SR2 and SR4 so that stop codes read from the program tape during non-print operation are thus bypassed and rendered ineffective.

The foregoing description concerns the operation of the typewriter either entirely manually or both manually and automatically under program control of a program tape or card read by the reader unit of the typewriter. The manner in which the typewriter controls the punching into taubulating cards, by the punch station of the punch-reader machine, of selectable portions of the copy printed (either manually or under automatic program control) by the typewriter will now be considered. For this mode of operation, the power switch of the punch-reader machine is turned On and the switches AS1 and AS2 (shown in FIG. 1*c* and which are conventionally mechanically connected for unicontrol operation) are manually opened to prevent automatic skip and automatic duplication operations of the machine.

The typewriter includes a card machine check relay CMCKR (FIG. 2*a*) which is connected through a conductor JL1–11 of the cable C1′ to the positive terminal of the power supply of the punch-reader unit. The relay CMCKR is also connected through the normally closed contacts 11 and 12 of the card machine control relay CMCR, the normally closed contacts 4 and 5 of the delay control relay DCR, the contacts 11 and 12 of a card machine delay relay CMDR, and a conductor JL1–5 of the cable C1′ to the contacts PS–11 which are arranged to read punched holes in the 11th index-point row of the program card of the punch-reader unit. Thus, if it be assumed that the punch-reader unit has been turned On and that its relay contacts 3BU are closed by reason of a blank tabulating card positioned at the punch station in readiness for punching or in process of being punched, a punched index point in the 11th row of the program card in effecting closure of the contacts PC–11 completes the energizing circuit for the card machine check relay CMCKR. The purpose in energizing this relay in the manner described will now be considered. It was earlier mentioned that the tabulating card is divided into fields of index-point columns of which each field relates to a particular type of numeric or alphabetic information. The 11th row of index-points of a program card is punched in a column corresponding to the first column of each "field" of the tubulating card and thus defines the beginning of each such field. The program tape or card of the typewriter is so arranged that a stop code is read from this tape or card each time that a new field of the tabulating card is entered. Reading this stop code will cause the typewriter keyboard to become locked up in a manner which will presently be explained, and the presence of the 11th row punching of the program card (indicative of the new field of the tabulating card) will cause the typewriter keyboard to become immediately and automatically unlocked for reasons which will presently be considered. In this manner an electrical interlock is provided that insures that the advancement of the tabulating card through the punching station of the punch-reader unit agrees with the advancement of the reading of the program tape or card of the typewriter.

When the card machine check relay CMCKR is picked up as last described, its contacts 2 and 3 close. If the on-off switch S1 of the typewriter is now manually actuated to close its contacts 1 and 3, the card machine control relay CMCR becomes energized and thereafter holds through its contacts 5 and 6, the contacts 5 and 6 of the card machine delay relay CMDR and the stop code reader contacts SR1, SR2 and SR4 of the reader unit of the typewriter. Thus relay CMCR remains energized until the next stop code is read from the program tape or card of the typewriter even though the on-off switch S1 of the typewriter is turned to off position. The contacts 11 and 12 of the card machine control relay CMCR interrupt the energizing circuit of the card machine check relay CMCKR which thereupon opens its contacts 2 and 3 to prevent continued energization of the card machine control relay CMCR by virtue of the manual positioning of the on-off switch S1 to close its contacts 1 and 3. The latter relay thus remains energized only through its contacts 5 and 6 and the stop code contacts SR1, SR2 and SR4 of the reader unit as just explained.

The contacts 15 and 16 of the card machine control relay CMCR close to permit energization of the reader control relay RCR by manual actuation of the start read switch S3 to close its contacts 1 and 2 and thereby initiate reading of the program tape or card by the reader unit of the typewriter in the manner earlier explained. The contacts 1 and 2 of the card machine control relay CMCR close to energize the key lock magnet KL and thereby unlock the keyboard of the typewriter. It will accordingly be apparent that the 11th row punched index-point of the program card of the punch-reader unit has the effect of energizing the card machine check relay CMCKR to indicate the beginning of a new field of the tabulating card, and this relay in turn permits energization of the card machine control relay CMCR to unlock the keyboard of the typewriter and condition the latter for manual and programmed operations.

Obviously if the tabulating card punch-reader unit had not previously been turned on, the card machine check relay CMCKR could not have been energized and the typewriter keyboard would remain locked up. Also the card machine check relay CMCKR could not have been energized if a stop code of the program tape or card had effected deenergization of the card machine control relay CMCR at a time other than that corresponding to the beginning of a new tabulating card field, since in that event there would be no 11th row index-point punched in the program card of the punch-reader unit by which to effect energization of the card machine check relay CMCKR. Thus the tabulating card punch-reader unit is electrically interlocked with the program controlled operations of the typewriter so that any malfunctioning or failure of either the tabulating card punch-reader machine or the typewriter is immediately detected and must be corrected by the typist before operations may be resumed. This interlock also checks the failure of a typist to enter sufficient information in a given field, such for example as a numeric field. To illustrate this, assume that a given numeric field of the tabulating card corresponds to six index-point columns and the typist enters only five digits of numeric information. If the start-read switch S3 is now manually actuated to resume automatic programmed operations, the reader control relay RCR cannot be energized since the card machine control relay CMCR stands deenergized with its contacts 15 and 16 opened. Thus proofreading of the document in preparation provides for visual verification of information that was punched in the tabulating card. This, with the automatic control of selecting the amount of typed information to be punched in the tabulating card and the electrical interlock just described provides complete tabulating card verification and eliminates the need for a manual verifying machine operation.

Figure 2E:
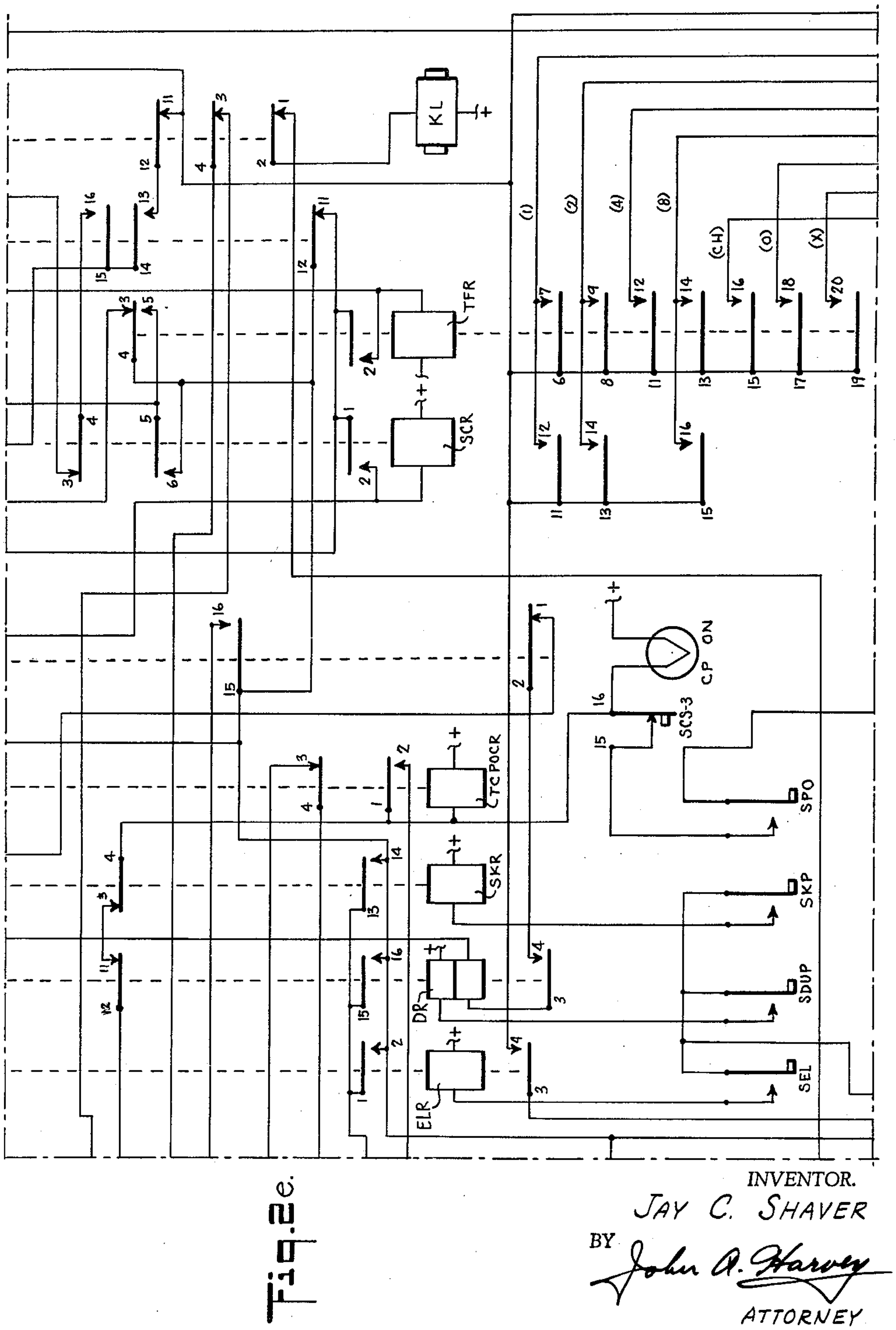
Figure 2F:
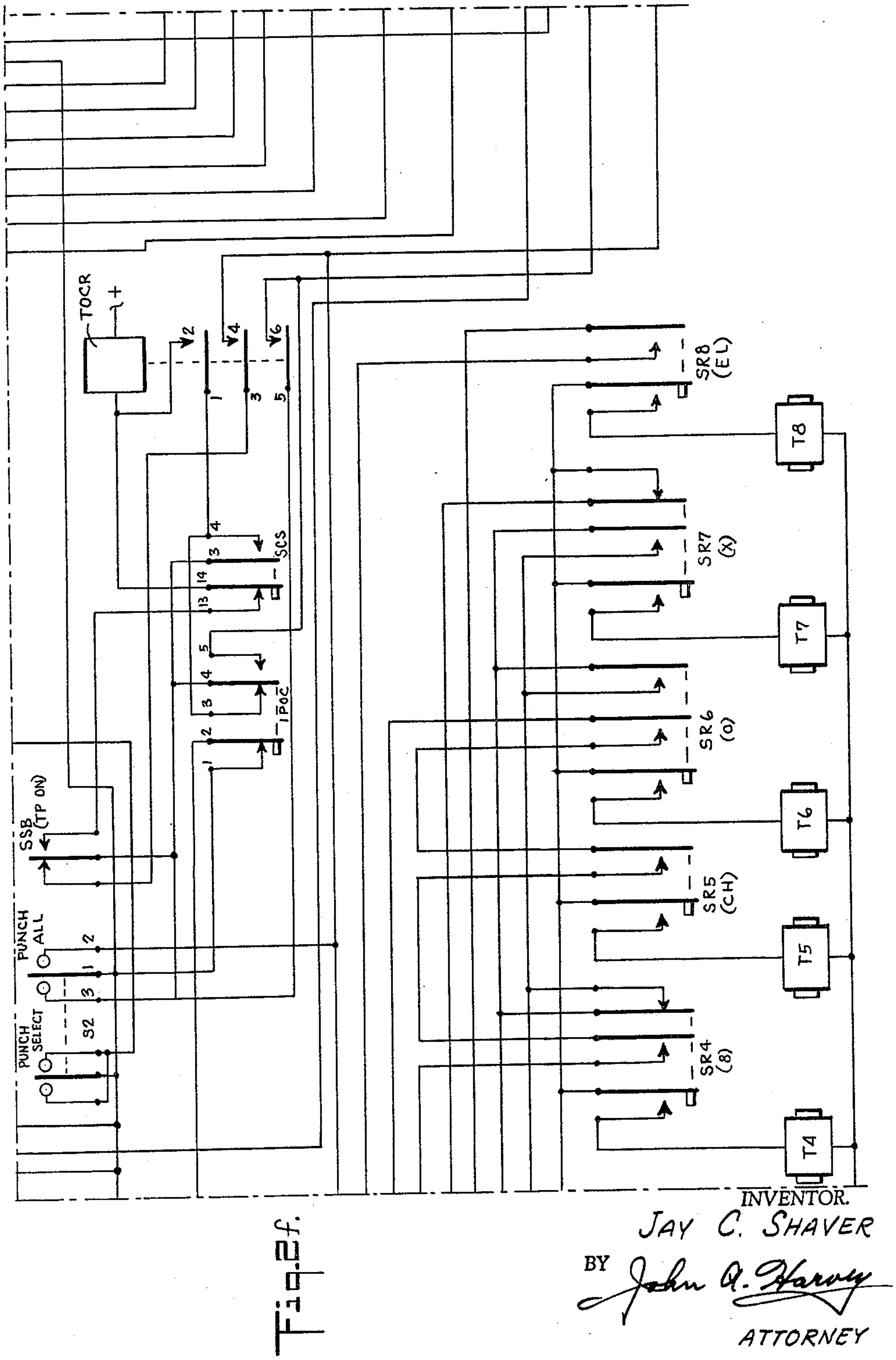
Figure 2G:
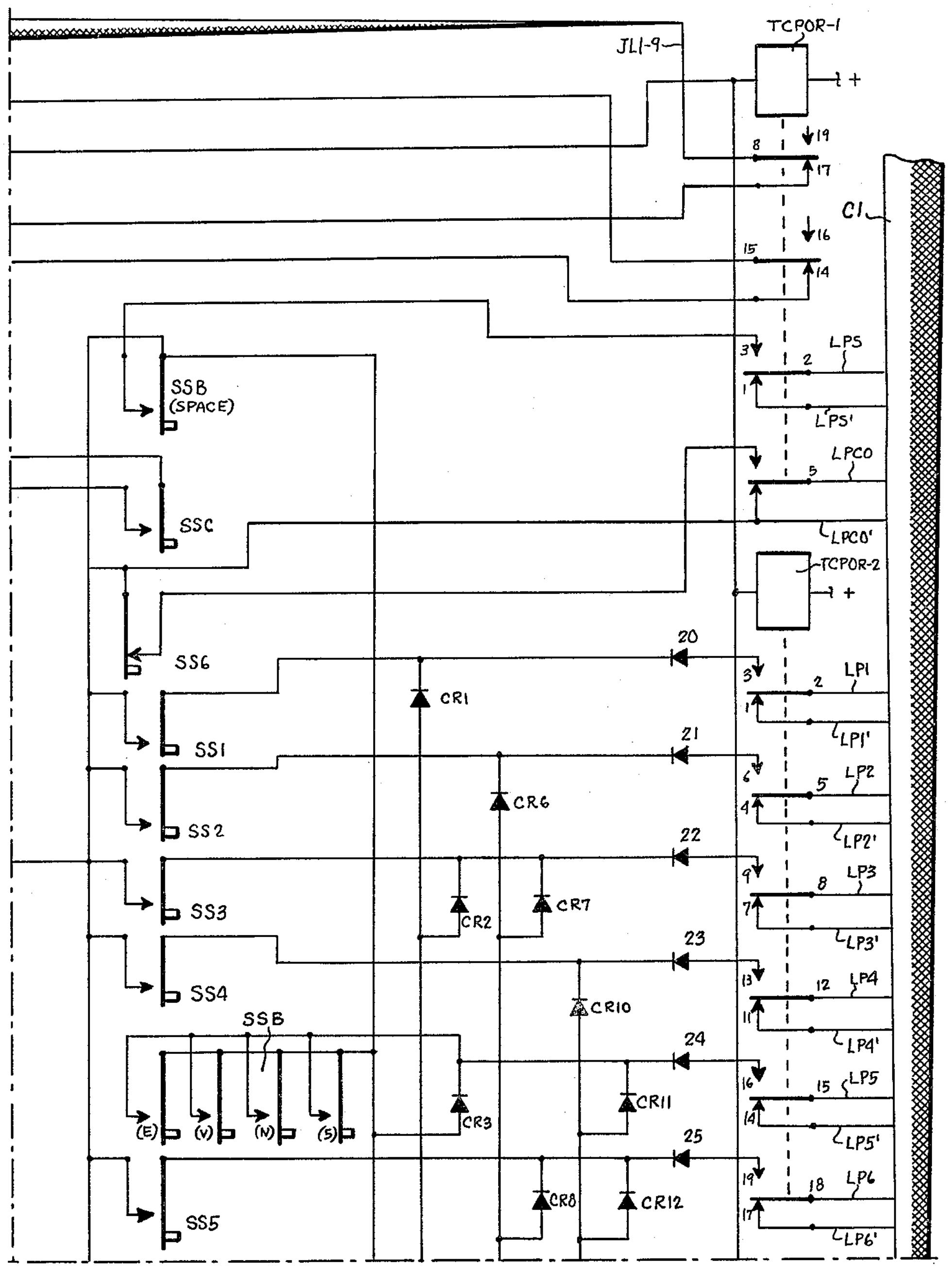
Figure 2H:
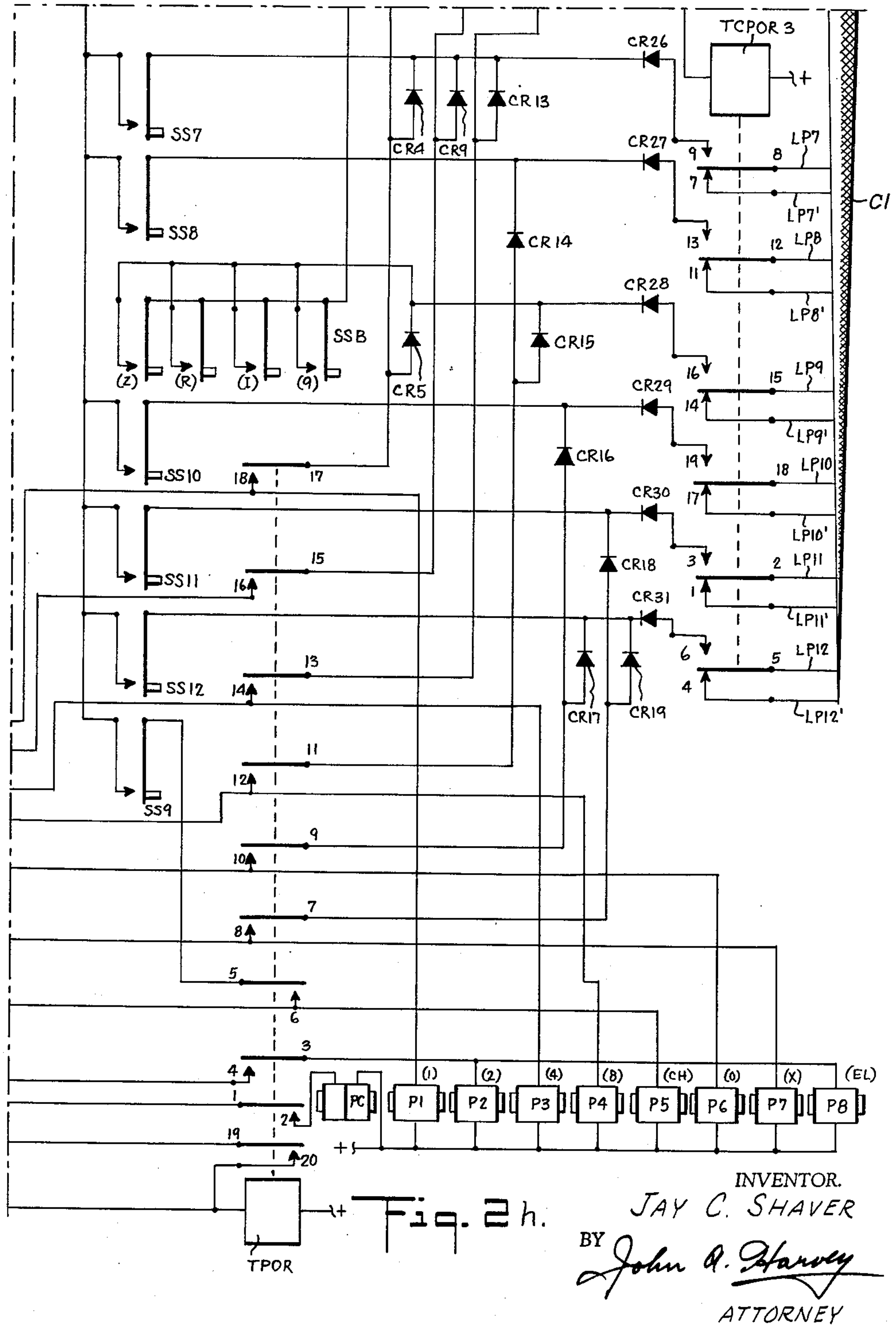

Tabulating card punching is initiated by manual or automatic actuation of a tabulating card-punch-on key lever of the typewriter which effects closure of selective punch-on contacts SPO (FIG. 2*e*). These contacts energize a tabulating card-punch-on control relay TCPOCR through type basket shift contacts SCS–3. The latter contacts prevent energization of the relay TCPOCR while the type basket is in its "upper case" position in the same manner that the case shift contact SCS prevents energization of the tape-on control relay TOCR as earlier described. The energization of the tabulating card-punch-on control relay TCPOCR also effects energization of tabulating card-punch-on relays TCPOR–1, TCPOR–2 and TCPOR–3, through the contacts 3 and 4 of a skip relay SKR, the contacts 11 and 12 of a duplicate relay DR, and the contacts 13 and 14 of the card machine delay relay CMDR. The contacts 1 and 2 of the relay TCPOCR hold both this relay and the last mentioned group of relays energized through the contacts 4 and 5 of the error relay ERR and the contacts 1 and 2 of the punch-off contacts POC. The contacts 3 and 4 of the relay TCPOCR prevent pick up (or effect deenergization) of the card machine control relay CMCR if the on-off switch S1 should be positioned at this time to close its contacts 1 and 2, a position inconsistent with tabulating card machine operation. The typewriter keyboard, therefore, becomes and remains locked by virtue of opening of contacts 1 and 2 of the card machine control relay CMCR. The contacts 11 and 12 of relay TCPOCR close to supply minus potential from the card punch-reader machine through the conductor JL1–12 of the cable C1′ to the contact 12 of the skip relay SKR so that the latter can thereafter effect a skip operation when energized as will presently be explained more fully. The contacts 13 and 14 of the relay TCPOCR close to apply minus potential from the card punch-reader unit to the contact 1 of the duplicate relay DR and to the contact 5 of the end-of-line relay ELR so that these relays can effect respective duplication and card release operations when energized. The contacts 15 and 16 of the relay TCPOCR apply the minus potential of the typewriter to contact 6 of the skip relay SKR, to contact 6 of the duplicate relay DR, and to contact 13 of the end-of-line relay ELR for reasons presently to be explained.

The transfer contacts 1, 2 and 3 of the tabulating card-punch-on relay TCPOR–1 transfer spacing control over the tabulating card moving through the punch station of the card punch-reader unit from the latter to the space contact SSB of the code selector unit of the typewriter. The transfer contacts 4, 5 and 6 of the relay TCPOR–1 transfers a common energizing circuit for all punch magnets in the card punch-reader unit to a code suppress contact SS6 provided in the code selector of the typewriter. The contact SS6 is actuated to open its normally closed contacts whenever any code produced by the code selector of the typewriter is not to be punched in a tabulating card; i.e., to suppress the punching of a carriage return (end of line) code, duplicate code, or special characters such as $, %, etc., as desired. The transfer contacts 1–9 and 11–19 of the tabulating card-punch-on relay TCPOR–2 transfers control over the punch magnets 1–6 of the card punch-reader unit from the latter through diode rectifiers CR20–CR25 to selected contacts of the code selector of the typewriter as shown. Similarly the transfer contacts 1–9 and 11–19 of the tabulating card-punch-on relay TCPOR–3 transfer energization of the punch magnets 7–9, 0, 11 and 12 of the card punch-reader unit from the latter unit through diode rectifiers CR26–CR31 to selected contacts of the code selector of the typewriter as shown. Thus actuation of the character key levers of the typewriter cause the code selector contacts to close in various combinations in accordance with the Hollerith code, and this in turn energizes corresponding punch magnets of the card punch-reader unit to punch each such code into the tabulating card passing through the punch station of the unit.

Since the hold circuit of the tabulating card-punch-on control relay TCPOCR and the tabulating card-punch-on relays TCPOR–1, TCPOR–2 and TCPOR–3 extends through the normally closed contacts 4 and 5 of an error relay ERR and the normally closed contacts 1 and 2 of the punch-off contact POC, it will be apparent that tabulating card punching is terminated either upon actuation of the error relay ERR by manual actuation of the error switch S7 to close its contacts 1 and 2, or upon manual or automatic actuation of a punch-off key lever of the typewriter to actuate the punch-off contact POC. The energizing circuit of the tabulating card-punch-on relays TCPOR–1, TCPOR–2 and TCPOR–3 also extends through the normally closed contacts 13 and 14 of the card machine delay relay CMDR, the normally closed contacts 11 and 12 of the duplicate relay DR, and the normally closed contacts 3 and 4 of the skip relay SKR so that the tabulating card-punch-on relays may also be deenergized (without effecting the energization of the tabulating card-punch-on control relay TCPOCR) by energization of any of these latter relays. This prevents any tabulating card punching operations for the duration of each duplicating and skipping operation of the card punch-reader unit.

The typewriter includes a "TAB" key lever which tabulates the typewriter carriage and also actuates skip contacts SKP (FIG. 2*e*) to energize the skip relay SKR. The contacts 13 and 14 of the skip relay SKR close to energize the card machine delay relay CMDR, which thereupon opens its contacts 5 and 6 to interrupt the hold circuit of the card machine control relay CMCR. The contacts 1 and 2 of the latter open to deenergize the key lock magnet KL and thereby lock up the keyboard of the typewriter. The contacts 11 and 12 of the card machine delay relay CMDR prevent reenergization of the card machine check relay CMCKR until the end of the delay interval controlled by the delay relay, and the contacts 13 and 14 of the latter interrupt the energizing circuit of the tabulating card-punch-on relays TCPOR–1, TCPOR–2 and TCPOR–3. The skip code read by the contacts SR2–SR6 from the program tape or card reader of the typewriter complete an energizing circuit for the delay control relay DCR, which whereupon opens its contacts 1 and 2 to terminate the reader by deenergizing the reader control magnet RCM and closes its contacts 2—3 and 12—13 to establish two holding circuits one of which extends through the normally closed contacts 3 and 4 of the card machine delay relay CMDR. The latter upon picking up opens its contacts 1—2 and 3—4 to drop out the relay DCR so that further delay is under control of the relay CMDR, the contacts 1 and 2 of which open to retain the reader clutch magnet RCM deenergized.

The skip relay SKR being now energized, its contacts 3 and 4 provide the initial deenergization of the tabulating card-punch-on relays TCPOR–1, TCPOR–2 and TCPOR–3. The contacts 11 and 12 of skip relay SKR complete an energizing circuit for effecting a skip operation of the card punch-reader unit; this circuit may be traced from the negative terminal of the power supply of the punch-reader unit through the closed contacts 3BU of the latter, the normally closed contacts 30–1 of the alphabetic field relay 30, the conductor JL1–13 of the cable C1′ and the normally closed contacts 3 and 4 of the tabulating card anti-repeat relay TCARR, the now closed contacts 11 and 12 of the tabulating card-punch-on control relay TCPOCR, the contacts 11 and 12 of the skip relay SKR, the now closed contacts 17 and 18 of the tabulating card-punch-on relay TCPOR–1 (now deenergized), and the line conductor JL1–9 of the cable C1′ to the control electrode of the vacuum tube V1 in the card punch-reader unit which is thereupon energized to energize the skip relay 25 and effect a skip operation in the manner earlier explained.

During the skipping operation last described, a tabulating card anti-repeat relay TCARR (FIG. 2*d*) is energized through a circuit which extends from the card punch-reader unit through the conductor JL1–11 (positive potential) of the cable C1′, the pick up winding of the relay TCARR and the conductor JL1–10 of the cable C1′ to the keyboard restore magnet KR. The tabulating card anti-repeat relay TCARR is thus energized concurrently with the skip operation, and holds for the immediate time through its contacts 13 and 14, the now closed contacts 5 and 6 of the skip relay SKR, and the now closed contacts 15 and 16 of the tabulating card-punch-on control relay TCPOCR. The contacts 3 and 4 of the relay TCARR interrupt the previously traced circuit by which the skip operation of the card punch-reader unit was initiated and the skip operation will then continue only as long as 12th row holes are punched in the card machine program tape as earlier explained. The contacts 5 and 6 of the relay TCARR interrupt the energizing circuit for the punch clutch magnet of the punch unit associated with the typewriter, so that this punch unit becomes deenergized during the card skip operation. Its contacts 15 and 16 provide a hold circuit for the card machine delay relay CMDR through the contacts 15 and 16 of the latter. Thus when the skip relay SKR becomes deenergized by the immediate reopening of the skip contacts SKP, the tabulating card anti-repeat relay TCARR maintains the card machine delay relay CMDR energized for the duration of the skip operation. This in turn maintains the program reader of the typewriter deenergized, the typewriter key levers locked up, and prevents reenergization of the card machine check relay CMCKR which in turn prevents reenergization of the card machine control relay CMCR.

Now when the keyboard restore magnet KR of the card machine becomes deenergized at the end of the skip operation, the tabulating card anti-repeat relay TCARR is likewise deenergized and its contacts 15 and 16 interrupt the hold circuit of the card machine delay relay CMDR. The card machine check relay CMCKR is then again automatically energized by an 11th row hole in the program card on the card punch-reader unit in the manner earlier explained and effects reenergization of the card machine control relay CMCR. Normal manual and automatic typewriter operations are thereupon resumed.

A card machine duplicating operation is initiated by energizing the duplicate relay DR. This is effected by closure of the contacts SDUP under actuation of the duplicate key lever of the typewriter accomplished either manually or under program control. The contacts 3 and 4 of the duplicate relay DR establish a holding circuit for this relay by energization from the tabulating card punch-reader unit. This energizing circuit may be traced from the positive potential terminal of the power supply of the latter unit through the conductor JL1–11 of the cable C1′, the hold winding of the relay DR, the contacts 3 and 4 of this relay, the normally closed contacts 1 and 2 of the tabulating card anti-repeat relay TCARR, the contacts 13 and 14 of the tabulating card-punch-on control relay TCPOCR, the contacts 11 and 12 of the relay TCARR, and the conductor JL1–12 of the cable C1′ to the negative terminal of the power supply of the punch-reader unit. The contacts 15 and 16 of the duplicate relay DR energize the card machine delay relay CMDR which operates as earlier described to deenergize the reader clutch magnet RCM, interrupt the hold circuit of the card machine control relay CMCR, and deenergize the tabulating card-punch-on relays TCPOR–1, TCPOR–2 and TCPOR–3.

The contacts 1 and 2 of the duplicate relay DR establish an energizing circuit from the negatively energized line conductor JL1–12 through the contacts 11 and 12 of the relay TCARR, the contacts 13 and 14 of tabualting card-punch-on control relay TCPOCR, the contacts 1 and 2 of the relay DR, the now closed contacts 14 and 15 of the tabulating card-punch-on relay TCPOR–1, and the line conductor JL1–3 of the cable C1′ to the vacuum tube V6 of the card punch-reader unit which energizes the duplicate 1 relay 28 to initiate a duplication operation. The duplicate 1 relay contacts 28–3 energize the vacuum tube V3 of the punch-reader unit in turn to energize the keyboard restore magnet KR, and this in turn energizes the tabulating card anti-repeat relay TCARR through the line conductor JL1–10 of the cable C1′ as previously described and to insure that this relay remains energized for the duration of the duplication operation. The contacts 1 and 2 and contacts 11 and 12 of the relay TCARR interrupt the hold circuit of the duplicate relay DR, and the contacts 13 and 14 of relay TCARR establish a temporary hold circuit for this relay through the contacts 5 and 6 of relay DR to insure that the former remains energized at least as long as the latter. The contacts 5 and 6 of relay TCARR interrupt the energizing circuit of the punch clutch magnet PC of the local punch unit of the typewriter to prevent punching operations during a duplication operation of the card punch-reader unit. The contacts 11 and 12 of the relay TCARR interrupt the energizing circuit (through the contacts 1 and 2 of the relay DR) which initiated the duplication operation. The contacts 15 and 16 of the relay TCARR establish a hold circuit for the card machine delay relay CMDR to insure that the latter remains energized as long as the former.

The duplication operation thus initiated continues under control of the contacts PC–12 of the card punch-reader unit, which are closed by holes punched in the 12th row of the program card of this unit, and upon completion of the duplication operation the vacuum tube V3 is deenergized in turn to deenergize the tabulating card anti-repeat relay TCARR of the typewriter. This drops out the machine delay relay CMDR to permit an 11th row punched hole of the card machine program card to reenergize in turn the relays CMCKR and CMCR as previously described and thereby restore normal operation of the typewriter either manually or under resumed program control.

A card release operation in the card punch-reader unit occurs each time that the typewriter carriage return key lever is actuated at the end of each typewritten line or any portion thereof. This carriage return key lever, whether manually actuated or actuated by reading an end-of-line code from the program tape or card, effects closure of the select end-of-line contacts SEL (FIG. 2*e*) to energize the end-of-line relay ELR. The contacts 1 and 2 of the latter energize the card machine delay relay CMDR which performs its familiar functions, the contacts 3 and 4 of the relay ELR permit actuation of the punch magnet P8 of the punch unit of the typewriter to punch an end-of-line code in the tape or card then being punched, and the contacts 15 and 16 of the relay ELR bypass the contacts 5 and 6 of the TCARR relay to insure that the punch clutch magnet PC is energized to punch this end-of-line code. The contacts 5 and 6 of the end-of-line relay ELR connect the negatively energized conductor JL1–12 through the contacts 11 and 12 of the relay TCARR and the contacts 13 and 14 of the tabulating card-punch-on control relay TCPOCR to the line conductor JL1–1 of the cable C1′ to energize the release magnet 1 of the card punch-reader unit. The contacts 1BL of the latter relay energize the keyboard restore magnet KR and, through the conductor JL1–10 of the cable C1′, the tabulating card anti-repeat relay TCARR which temporarily holds through its contacts 13 and 14 and the contacts 12 and 13 of the end-of-line relay ELR at least until the latter relay has dropped out. The relay TCARR performs its usual function of interrupting the energization of the card release energizing circuit which extends through the conductor JL1–1 and of maintaining the card machine delay relay CMDR energized until the relay TCARR is deenergized at the completion of the card release operation.

An error switch S7 may be manually actuated to release a tabulating card that has been punched in error and to duplicate into a new tabulating card the information which was punched correctly in the tabulating card prior to the error. This eliminates the need for retyping all of the information that was correctly punched in the tabulating card prior to the error. Manual actuation of the error switch S7 energizes the error relay ERR. The contacts 1 and 2 of the latter interrupt the hold circuit of the reader control relay RCR and thus terminate operation of the program tape or card reader of the typewriter. The contacts 4 and 5 of the error relay ERR interrupt the hold circuit of the tabulating card-punch-on control relay TCPOCR and the tabulating card-punch on relays TCPOR–1, TCPOR–2 and TCPOR–3 thus to drop out these relays and terminate punching operations of the card punch-reader unit. The contacts 14 and 15 of the error relay ERR complete an energizing circuit from the negatively energized conductor JL1–4 of the cable C1′ through the conductor JL1–3 to the vacuum tube V6 of the card punch-reader unit to energize the duplicate 1 relay 28 and initiate a duplicating operation.

This energizes the tabulating card anti-repeat relay TCARR as previously explained, but this relay performs no function at this time. The contacts 16 and 17 of the error relay ERR complete an energizing circuit from the negatively energized conductor JL1–4 of the cable C1′ through the conductor JL1–6 to the vacuum tube V7 of the card punch-reader unit to energize the alphabetic field relay 30 and thus permit duplication over blank columns of the tabulating card for reasons previously mentioned. The duplicating operations are controlled by the 12th-row punching of the program card of the punch-reader unit, and each actuation of an error switch S7 thus causes successive fields of the card in the reading station to be duplicated in the punching station. Thus if preprogramming by the program card of the card punch-reader unit establishes five fields to be punched and an error is made in the third field, three manual actuations of the error switch S7 will cause duplication of the succeeding three fields of the card in the reading station into the card in the punch station and the card in the punch station is automatically released at the end of the fifth card field as explained above in connection with the operation of the punch-reader unit. This release of the card automatically inserts a blank card in the punch station, and two additional manual actuations of the error switch S7 correctly positions the new card at the initiation of the field where the error was previously made while duplicating all information into the new card of the first and second fields of the card wherein the error appeared. The program tape or card of the typewriter is now manually turned back to the beginning of the card field where the error occurred, and the typist continues the typing operation.

When the card punch-reader unit is automatically operated under control of the program tape or card of the typewriter, the stop-read switch S5 should not be manually actuated to stop program reading since this would interrupt the hold circuit of the card machine control relay CMCR at a point where no 11th row punch appeared in the program card of the punch-reader unit. The card machine check relay CMCKR would not then be automatically energized in turn to effect automatic energization of the card machine control relay CMCR. Thus the keyboard of the typewriter would lock and remain locked until the related positions of the program tape or card of the typewriter and tabulating card in the punch station of the punch-reader unit are restored by appropriate manual operations.

The sequence of programmed operations employed in a typical billing operation is illustrated in FIGS. 3*a*, 3*b* and 3*c* of the drawings. Here the development of the form in preparation is shown in association with the program tape or card used in preparing the form, an associated tabulating card used to record selected billing information, and the associated program card employed in the tabulating card machine for the preparation of this particular billing form. The operations specified by the program tape or card are indicated by abbreviated words rather than the actual functional-control and character-print punch codes used. In this, it is assumed for simplicity that the local punch associated with the typewriter is not used to record information so that references to "punch on" and "punch off" will be understood to refer to the controlled operation of the punch station of the card machine. Similarly, the information recorded in the tabulating card is indicated by numerals and alphabetic characters rather than the punch codes employed in recording such information. The card machine program card illustrates successive column punching in a given row of index prints by use of rectangles in lieu of the actual punching of successive index-point columns. The numbers enclosed in parentheses in these several figures refer to the following correspondingly numbered descriptive paragraphs which explain the reasons for certain of the operations performed in this illustrative application of the invention.

(1–A) The programming shown provides proper carriage positioning for the first three entries on the top line of the document. Inasmuch as these entries are not normally punched into the tabulating card, it is good practice to have the Punch Off code at the beginning of the program tape or card. This insures that the tabulating card Punch will be turned Off regardless of the condition of the machine when the document is started. The End Line (EL) code insures that the operator takes a Start Read operation so that the Punch Off code will be read prior to typing the first entry.

(1–B) The card machine program card has an 11th row punch at column 1 to provide for unlocking the keyboard after it locks as each stop code is read. In fact, an 11th row punch is required to unlock the keyboard when the machine is turned On. This insures that a new card is in column 1 at the tabulating card punch station when the machine is turned on to start a job.

(2–A) The entry for customer number is typed automatically and it will be punched in the tabulating card because an On code was read in the program tape or card prior to reading and typing this entry.

(3–A) It is necessary that the tabulating card punch be turned Off prior to spacing the form between the customer number and territory entries. It can be seen that the tabulating card does not have a blank space between these entries; therefore, to avoid spacing the tabulating card out of position, the tabulating card punch must be turned Off prior to spacing on the document. The punch is again turned On before typing the entry for the territory field.

(4–A) The invoice number and invoice date will be typed manually. A stop code in the program tape or card stops the reader with the carriage in correct position for typing these entries. Notice that a Start Read operation will be required following the typing of the invoice number. This will prevent the space on the form (that is required between these two entries) from causing a space of the tabulating card.

(4–B) An 11th row punch will be required in columns 14 and 20 of the card machine program card. These will unlock the keyboard after it has been locked when the stop codes are read with the tabulating card in these columns.

(5–A) The End Line (EL) code will cause a carriage return and line spacing only. The tabulating card punch was Off when the codes were read; therefore the tabulating card is not released.

(6–A) The customer name is typed automatically from the program tape or card with the tabulating card punch On. It is punched in the tabulating card. The Skip code is necessary in the program tape or card following the name so that a skip of the tabulating card will complete the card name field.

(6–B) The channel 12 punching will cause the tabulating card skip operation to be completed to column 50 after a skip has been initiated by the skip code at column 41.

(7–A) The programming of the program tape or card for the balance of the automatic typing necessary to complete the invoice heading is not shown.

(8–A) The End Line (EL) code is the beginning of the item information of a program tape or card. The requirement of the End Line operation insures that a Start Read operation is taken prior to typing, so that the On code is read. It is recommended that, when using program cards, each such card be ended with a punch Off code prior to the stop code. This insures that the punch is Off while changing program cards and avoids accidental punching of unwanted codes.

(8–B) The 11th row punch is required in column 50 to unlock the keyboard due to the stop code being read for the Quantity Ordered field.

(8–C) Another 11th row punch is required in column 54 to unlock the keyboard after reading a stop code for the Quantity Shipped field.

(9–A) The tabulating card layout is such that a space between entries on the document can cause a space in the card. This avoids turning the tabulating card punch Off before the space and punch On after the space. Programming can be reduced by this procedure if the tabulating card layout permits blank columns between fields.

(9–B) The 1st row punch is necessary to provide for duplication (later when duplicating over fields in making an error correction) over the blank column in column 62.

(10–A) The tabulating card punch is Off to prevent tabulating card punching when the item description is automatically typed from the program tape or card.

(11–A) The tabulating card punch is turned On prior to tabulating after the item description is typed. The tabulation will cause the tabulating card to skip from column 67 to 72.

(11–B) The 12th row punching causes skipping to be continued to column 72 after it was initiated by the tabulation in column 67. The 11th row punch is required due to the stop code read at column 72. The 1st row punches are required to permit duplication over the blank field.

(12–A) The End Line (EL) code will cause a tabulating card release from column 77. The Dup code will cause a new card fed in to be duplicated. The duplication will be continued by the 12th row punching to column 26. If it had been necessary to break the continuous punches in the 12th row between columns 2 and 25, additional Dup codes would have been added to the program tape or card. One code is required for each unbroken series of 12th row punches to duplicate the desired field. The skip code along with the 12th row punching will cause the tabulating card to skip from column 26 to column 50.

(12–B) It is good practice to punch 12th row punches in the program card to the right of the last field to be punched. 12th row punches along with 1st row punches permit a positive error release without holding the error release key depressed to the end of the tabulating card feed.

*Typewriter to Tabulating Card Reader Electrical Control System*

A second form of typewriter unit utilizing the present invention is connected to the tabulating card machine by the cables C2 and C2′ (shown in FIGS. 1*a*, 1*b* and 1*d*) and includes an electrical control system as shown in FIGS. 4*a*–4*i*, which should be considered together as a unitary structure as indicated in FIG. 4. The typewriter construction and its electrical control system are, with certain differences hereinafter noted, essentially similar to those disclosed and claimed in the above mentioned Patent No. 2,905,298.

Much of the arrangement and operation of the second form of typewriter now to be described is similar to the first form described hereinabove as will be evident from inspection. Accordingly, similar components employed in these two forms of typewriter are indicated by similar reference numerals. Whereas the form of typewriter first described is one for controlling the tabulating card punch-reader machine for purposes of recording information in a tabulating card, the form of typewriter presently to be described is one for receiving and printing information recorded in tabulating cards. These two forms of typewriter may both remain electrically connected to the punch-reader machine but are not both operated at the same time in conjunction with the machine; rather one form or the other of typewriter is made operative with the card machine at any given time depending upon the particular application.

The typewriter may be manually operated to perform normal typing operations by actuation of the on-off switch S1 (FIG. 4*a*) to close its contacts 1 and 2 and thereby directly energize the card machine control relay CMCR. The contacts 3 and 4 of the latter relay close to energize the key lock magnet KL through the local punch tape contacts PTC which are closed whenever tape or card stock is in the local punch unit in readiness for punch recording of selected typed information. The contacts 5 and 6 of the card machine control relay CMCR close to energize the program tape or card reader control magnet RCM through contacts of the card machine delay relay CMDR, a reader delay control relay DCR1, the reader control relay RCR, and the carriage return tabulating contact CRTC as previously described. Programmed operations of the typewriter are effected by actuation of the start read switch S3 to close its contacts 1 and 2 and thereupon energize the reader control relay RCR, this programmed operation being in all respects similar to that described in connection with the first form of typewriter.

The present form of typewriter, unlike the form previously described, includes a manually actuatable non-print switch S9 which may be manually actuated to close its contacts 1 and 2 and thereupon energize a manual non-print relay MNPR. The contacts 12 and 13 of this relay energize non-print relays NPR–1, NPR–2 and NPR–3 which are thereafter held with the manual non-print relay MNPR through the contacts 5 and 6 of the non-print relay NPR–3, the contacts 11 and 12 of a print restore relay PRR, the now closed contacts 1 and 2 of the reader control relay RCR, and the normally closed contacts 1 and 2 of the stop read switch S5. Manual actuation of the latter switch interrupts the hold circuit of the reader control relay RCR, which thereupon drops out, but the now closed contacts 1 and 3 of the stop read switch S5 continue to hold the non-print relays NPR–1, NPR–2 and NPR–3 through the contacts 2 and 3 of the latter relay and also holds the manual non-print relay MNPR through its contacts 4 and 5. This insures that the non-print operation continues to completion of the final cycle of operation of the program tape or card reader as the latter is halted by deenergization of the reader control relay RCR.

Automatic non-print under program control is accomplished by reading a non-print code 4—8—CH to energize an automatic non-print relay ANPR through the contacts 5 and 6 of the reader control relay RCR and selector contacts SC6 which close on automatic actuation, under program control, of a non-print key lever of the typewriter. The automatic non-print relay ANPR energizes the non-print relays NPR–1, NPR–2 and NPR–3 through its contacts 3 and 4, and establishes a hold circuit through its contacts 1 and 2 and the normally closed contacts 1 and 2 of a print restore relay PRR. The latter relay is energized to terminate automatic non-print operations by reading a print restored code 4—8—O. A hold circuit for the print restore relay PRR is established through its contacts 15 and 16 and the contacts 8 and 9 of the non-print relay NPR–3 to insure that the non-print relays become deenergized prior to deenergization of the print restore relay PRR.

In preparing a program tape or card by use of the local punch unit associated with the present form of typewriter, the automatic non-print code 4—8—CH may be directly punched by manual or automatic operation of a non-print key lever, but the print restore code 4—8—O must be punched into the program tape or card by manual actuation of a print restore code switch S10 to energize a print restore code relay PRCR.

Also in connection with the preparation of a program tape by use of the local punch unit associated with the typewriter, it may be mentioned that certain special codes are used for programmed control of the tabulating card punch-reader machine. These special codes include an 8—X—EL release code, a 2—X—EL skip code, a 4—X—EL duplicate mode, and a 1—X—EL zero suppress code. It will be noted that all of these codes include X—EL code bits, and their punching into the program tape or card is accomplished by manual actuation of an "X—EL" switch S11 to close its contacts 1 and 2 concurrently with manual actuation of an appropriate one of the numeric key levers 1, 2, 4 or 8. This manual actuation of the switch S11 has the effect of applying the energization of the punch clutch magnet PC through diode rectifiers CR21 and CR22 concurrently to the X and EL punch magnets P7 and P8.

Since the present form of typewriter only receives information recorded in tabulating cards and does not supply information for recording in such cards, there is no tabulating card punch selection function provided by the present form of typewriter as in the form previously described. The selection of the local punch for recording in a tape or card information either typed or received from the tabulating card reader is accomplished in the present form of typewriter by energization of the tape-on control relay TOCR through a contact SC8, actuated by a punch-on key lever of the typewriter, whenever the punch select switch S2 is manually moved to the punch select position. The relay TOCR holds through its contacts 4 and 5 and the normally closed contacts 1 and 2 of the punch-off control contact POC also key lever actuated.

When it is desired to receive information read from tabulating cards fed through the tabulating card punch-reader unit, the on-off switch S1 is manually actuated to close its contacts 1 and 3. The latter contacts thereupon energize the card-read on relays CROR–1, CROR–2 and CROR–3 which transfer their contacts to connect the reading pin contacts of the tabulating card reader through code-form conversion diode rectifiers CR1–CR20 to the code translator T1–T8 of the typewriter and punch magnets P1–P8 of the local associated punch unit. The code-form conversion here accomplished is from the Hollerith 12-bit form used in the card machine to the 8-bit form used in the typewriter. Contacts 15 and 16 of the relay CROR–3 now complete an energizing circuit for the card machine check relay CMCKR through the contacts 1 and 2 of the card machine control relay CMCR and the cable conductor JL2–9 which extends to the contacts PC11 associated with the 11th row of the program card of the card machine. If the latter program card is so positioned at this time that it contains an 11th row punched hole to indicate that the tabulating card is in readiness to read the first record column of a record field, then the 11th row contacts PC–11 of the card machine are closed and the card machine check relay CMCKR is thereupon energized to close its contacts 1 and 2. The latter contacts upon closing energize the card machine control relay CMCR through the carriage return and tabulating contact CRTC. A hold circuit is established for this relay through the last mentioned contacts, the now closed contacts 7 and 8 of the relay CMCR, the normally closed contacts 1 and 2 of the stop read switch S5, and the contacts 11 and 12 of the punch error relay PER to a circuit which is energized through the reader contacts RC1, RC2, and RC4 except during reading of a stop code 1—2—8. The contacts 1 and 2 of the card machine control relay CMCR open to deenergize the card machine check relay CMCKR. The contacts 3 and 4 of the relay CMCR unlock the keyboard of the typewriter by energizing the key lock magnet KL. The typewriter is now available for manual typing or may be placed in automatic operation by manually depressing and releasing the start read switch S3 to energize the reader control relay RCR and the reader clutch magnet RCM.

If the card machine control relay CMCR should now be deenergized by reading a stop code 1—2—8 or by reason of the carriage return and tabulating contact CRTC opening due to a carriage return or tabulation operation of the typewriter, the relay CMCR must again be energized by operation of the card machine check relay CMCKR. This requires, as previously explained, that the tabulating card be positioned in the card machine at the initiation of a record field identified by an 11th row punch of the card machine program card to effect closure of the 11th row contacts PC–11. So long as the tabulating card is so positioned and there is present an 11th hold punch of the card machine program card, the card machine check relay CMCKR is automatically energized upon dropout of the card machine control relay CMCR to close its contacts 1 and 2 whereupon the latter relay is again automatically energized and holds through its contacts 7 and 8 as previously described.

The reader control relay RCR remains energized except when a stop code 1—2—8 is read, so that reading of a stop code requires that reading be resumed by manual actuation of the start read switch S3 (the automatic and often repeated reenergization of the card machine control relay CMCR takes place in the manner just described). Since the key lock magnet KL is energized through the contacts 3 and 4 of the card machine control relay CMCR as earlier explained, failure of the latter relay to be automatically reenergized after a carriage return or tabulation operation or after reading a stop code is evidenced by the keyboard remaining locked up. Accordingly each programmed tabulation code provides an automatic check that the tabulating card in the card machine is standing at the beginning of a card field, and this applies also with respect to each programmed carriage return operation and each programmed stop of the typewriter operation.

Whenever an 8—X—EL release code or 2—X—EL skip code is read from the program tape or card, a card machine delay relay is energized through a circuit which will be traced as follows: positive potential is applied from the card machine through the conductor JL2–8 and through the contacts 8 and 9 of the card read on relay CROC–3 to the pick-up winding of the card machine delay relay CMDR, and continues from the latter winding through a diode rectifier CR27 or CR28 and closed contacts of the reader contacts RC4, RC7 and RC8 or RC2, RC7 and RC8, through the contacts 7 and 8 of the non-print relay NPR–1, and through the contacts 12 and 13 of the relay CROR–3 and the conductor JL2–2 to the negative terminal of the energizing source in the card machine. The card machine delay relay CMDR having been thus energized is held energized through its contacts 13 and 14 and a conductor JL2–4 which extends to the keyboard restore magnet KR of the card machine and which is maintained energized until completion of a card release or card skip operation. While the card machine delay relay CMDR is thus energized, its contacts 1 and 2 terminate operation of the program tape or card reader by interrupting the energizing circuit of the reader clutch magnet RCM; and its contacts 11 and 12 interrupt the energizing circuit for the translator clutch magnet TC of the typewriter to interrupt the operation of the latter. The card machine delay relay CMDR thus stops the program tape or card reader and prevents further operation of the typewriter until the release or skip operation has been completed by the card machine.

A tabulating card skip operation is initiated by reading a programmed skip code 2—X—EL by which to complete a circuit from the negatively energized conductor JL2–2 through the reader contacts RC3, RC7 and RC8 to the conductor JL2–6 which energizes the vacuum tube V1 of the card machine and thereupon energizes the skip relay 25 of the latter. It was previously pointed out above during description of the card machine operation that the contacts 25–4 of the relay 25 energized the vacuum tube V2 and escape magnet EM of the card machine, and that the escape magnet armature contact EAC energizes the vacuum tube V4 and the escape interlock relay 22. The contacts 25–3 of the skip relay 25 energize the vacuum tube V3 which in turn energizes the keyboard restore magnet KR and, through conductor JL2–4, energizes the hold circuit for the card machine delay relay CMDR as earlier explained. The normally open contacts 25–1 of the skip relay 25 close to transfer control of the vacuum tubes V1 and V2 to the 12th row field definition contacts PC–12 to continue the skip operation over one or more selected card fields as established by the 12th row punching of the card machine program card.

Whenever a programmed release code 8—X—EL is read, the reader contacts RC4, RC7 and RC8 complete a circuit from the negatively energized conductor JL2–2 to the conductor JL2–5 which extends to the release relay 1 of the card machine. Energization of the release relay 1 effects a card release operation in the card machine in the manner previously described with reference to this unit.

Information is read from a tabulating card read by the card reader station of the card machine whenever a duplicate code 4—X—EL is read from the program tape or card. Reading of this code completes an energizing circuit from the negatively energized conductor JL2–2 through the reader contacts RC3, RC7 and RC8 to the conductor JL2–7 which extends to the vacuum tube V6 of the card machine and initiates a duplicate operation by energization of the duplicate 1 relay 28. The duplicate operation in the present form of typewriter proceeds one index-point column at a time rather than by fields of the tabulating card as in the manner described previously. Thus, in the present arrangement, a field of the tabulating card is duplicated only by reading from the program tape or card associated with the typewriter (or by manual actuations of the "Duplicate" key lever of the typewriter) successive duplicate codes corresponding in number to the number of index-point columns of the tabulating card field. To this end, 12th row punching of the card machine program card is not used, but 1st row punching is used over each card field to be duplicated so that the alphanumeric relay 30 is energized to permit its contacts 30–1 to energize the escape magnet EM when the contacts 27–3 close upon pick-up of the Dup.–3 relay 27.

During each such duplicate operation, the negative terminal of the power supply of the typewriter is applied through the contacts 5 and 6 of the card read-on relay CROR–3 and the conductor JL2–3 to the cam actuated contacts P5 of the card machine. As these cam contacts close during each card read cycle, the negative potential of the conductor JL2–3 is applied through the relay contacts 27–2 of the duplicate 3 relay 27 to the reader contacts of the tabulating card read station. The sequence of relay operation in the card machine is that previously described, and the relay 2 upon picking up energizes the punch clutch magnet PC. This actuates the reader pins of the tabulating card reading station. The information recorded in each successive column of index points of a tabulating card closes the read station contacts in various code combinations so that various ones of the line conductors LR1–LR12 become negatively energized. The latter line conductors are connected through individual contacts of the card read on relays CROR–1, CROR–2 and CROR–3 as shown and thus are effective to energize the translator magnets T1–T8 of the typewriter through the code conversion diode rectifiers CR1–CR20. The translator clutch magnet TC of the typewriter is concurrently energized through the normally closed contacts 11 and 12 of the card machine delay relay CMDR and the contacts 2 and 3 of the card read on relay CROR–1 from the conductor JL2–1 which is negatively energized concurrently with the reader contacts of the reading station of the card machine. Thus as successive index-point columns of the tabulating card are read by the reading station of the card machine, the translator clutch magnet TC and translator magnet T1–T8 of the typewriter are energized to effect automatic typing of the information read from the tabulating card.

As earlier mentioned, the 1st row punching of the card machine program card defines the card field over which the duplication operation may continue. During this operation, it is to be noted that the card read on relays CROR–1, CROR–2 and CROR–3 interrupt the energizing circuits to the punch magnets of the punch station of the card machine so that the punch station is inoperative so long as these relays are energized to supply information read from a tabulating card to the typewriter.

Several aspects of the automatic typing of information read from a tabulating card during a duplicate operation as last described should be noted. The first of these is that a diode rectifier CR26 is included in series with the reader contacts RCC of the program tape or card reader and similar diode rectifiers CR23–CR25 are included in series with certain of the reader contacts RC–1, RC–3 and RC–7 for the purpose of preventing back coupling through the reader contacts during various program code actuated combinations of these reader contacts. The need for this will be evident from mere inspection of the representative code set forth in the table of FIG. 5. Secondly, it is to be noted that the negative terminal of the power supply of the typewriter extends through the reader tape contacts RTC (normally closed when a program tape or card is positioned in the reader in readiness to be read), the contacts 17 and 18 of the non-print relay NPR–3, and normally closed contacts of both the reader contacts RC7 and RC8 to a common energizing bus connected to a transfer contact in each of the reader contacts RC1–RC8 so that these transfer contacts are able to energize the translator magnets T1–T8 of the typewriter (and punch magnets P1–P8 of the local punch unit) except when both of the reader contacts RC7 and RC8 are concurrently actuated as occurs only when reading a release code 8—X—EL, a skip code 2—X—EL, a duplicate code 4—X—EL or a zero suppress code 1—X—EL. Accordingly any one of the latter codes is effective to terminate automatic operation of the typewriter whenever such card machine programming code is read. Such termination of typewriter operation is likewise effected by energization of the non-print relay NPR—3 to open its contacts 17 and 18. Thirdly, note that the card machine control relay CMCR is dropped out only by the contacts CRTC when actuated by a carriage return or tabulation operation of the typewriter. Thus, manual and program-controlled operations of the typewriter may continue even though a preceding duplication operation when completed leaves the tabulating card standing in the middle of a tabulating card field (the relay CMCR holding up, an 11th row punch in the card machine program card is not needed to pick up the relay CMCKR in order to pick up in turn the relay CMCR).

Whenever numeric information is read from a tabulating card and supplied to the typewriter during the duplicate operation last described, any zeroes preceding the first significant digit of the numeric word or preceding the decimal point of the numeric word may be suppressed by reading a program zero suppress code 1—X—EL. This code energizes a zero suppress relay ZSR which thereupon establishes a hold circuit through its contacts 12 and 13 and through a key lever contact KC having normally closed contacts which are actuated to open circuit position by any actuated numeric key lever or the period key lever of the typewriter. During the interval when the zero suppress relay ZSR is thus energized, any energization of the line conductor LRO by the 10th index row contact (which is both a zone contact for alphabetic information and a zero contact for numeric information) of the tabulating card read station causes a translator magnet T5 of the typewriter to be energized through the now closed contacts 4 and 5 of the zero suppress relay ZSR and a diode rectifier CR10. Energization of the translator magnet T5 in this manner prevents the typing of a zero but permits spacing of the typewriter carriage. At the same time, the zero translator magnet T6 energization is prevented by the opening of the contacts 1 and 2 of the zero suppress relay ZSR. Now when the first significant numeric character is typed or a period corresponding to the decimal point of a numeric word is typed, the key lever contact KC is thereupon opened to deenergize the zero suppress relay ZSR and all further zeroes read from the tabulating card are typed by the typewriter.

During etach non-print operation when the non-print relay NPR–1 is energized, its contacts 7 and 8 interrupt the negative energizing circuit which extends through the contacts 12 and 13 of the relay CROR–3 and the conductor JL2–2 from the power supply of the card machine. This has the result that non-print operations of the typewriter terminate control over the card machine for all of the release, skip, duplicate and zero suppress codes read from the program tape or card. Accordingly each non-print operation effectively suppresses further controlled operation of the card machine for the duration of the non-print interval.

It may be noted in this respect that the contacts 18 and 19 of the non-print relay NPR–2, when the latter is energized during each non-print interval, effects transfer of the negative terminal of the typewriter power supply directly to the reader common contact RCC of the program reader. This has the effect that, when the reader contacts RCC close during each cycle of the reader operation, these contacts now energize the transfer contacts of the reader contacts RC1–RC8 through a circuit which may be traced from the reader contact RCC, the diode rectifier CR26, the now closed contacts 5 and 6 of the non-print relay NPR–1, the contacts 13 and 14 of the card fed relay CFR, the punch latch contacts PLC, the contacts 13 and 14 of the anti-repeat relay ARR, the contacts 1 and 2 of the punch error relay PER, and the now closed contacts 18 and 19 of the non-print relay NPR–1 to the common bus which energizes the transfer contact RC1–RC8. It was previously pointed out that the latter common bus is ordinarily energized only when one of the reader contacts RC7 or RC8 remains in unactuated position during the reader cycle so that this common bus became deenergized when reading any card machine control code which contained the X—EL code bits. Accordingly, the energizing circuit last traced is effective during each non-print operation in maintaining energized the common energizing bus for the reader contacts RC1–RC8 and permits reading and punching into a program tape or card at the local punch unit of the release, skip, duplicate and zero suppress card machine control codes. This is the manner by which these card machine control codes are recorded in a new or duplicate program tape or card punched by the local punch unit associated with the typewriter. Thus active use of the control code for a card machine operation accompanied by recording of this same control code in the newly punched program tape or card requires that the original program tape or card have the card machine control code appearing twice in succession, the first appearance of the code being preceded by an automatic non-print code and being followed by a print restore code.

It will be apparent from the foregoing description of the invention that it provides a novel system for translating information to and from recording in tabulating cards and permits such translation to be effected essentially in automatic manner while at the same time automatically insuring that all such information translation is clearly identified with preselected successive information fields of the tabulating card. The recording of information in tabulating cards is accomplished in an automatic and routine manner with little or no operator attention and as a direct by-product of a typing operation. The transfer and typing of information read from tabulating cards similarly may be accomplished automatically and in routine manner, and this information may be interspersed as desired with that typed manually and that derived and typed directly from a program tape or card. The selective recording of information in tabulating cards, and the selective use of recorded information from tabulating cards, may be entirely under control of a program tape or card so that the selective translation of information to and from tabulating cards during the preparation of various types of documents is easily and readily changed simply by selection of an individual program tape or card applicable to the particular document in preparation.

While specific forms of the invention have been described for purposes of illustration, it is contemplated that possible changes may be made without departing from the spirit of the invention.

I claim:

1. An information translation system comprising record means for translating successive information codes to and from recording in record media, said recording being by successive preselected code recording positions preselected groups thereof to constitute recording fields of said media, printing means for reproducing printed copy concurrently with said translation of information, programming means for effecting selectably independent and selectably concurrent programmed control over the operations of said printing and record means, and means responsive to field indicia information supplied by operation of said record means for controlling the continuing interrelated operations of said record means and at least one of said printing and programming means to maintain the otherwise independent operations thereof correlated with said recording fields of said record media.

2. An information translation system comprising record means for translating successive information codes to and from recording in record media, said recording being by successive preselected code recording positions preselected by groups thereof to constitute recording fields of said media, printing means for reproducing printed copy concurrently with said translation of information, programming means for effecting selectably independent and selectably concurrent programmed control over the operations of said printing and record means, and means responsive to field indicia information supplied by operation of said record means and to preselected programmed operations specified by said programming means for controlling the continuing interrelated operations of said record means and at least one of said printing and programming means to maintain the otherwise independent operations thereof correlated with said recording fields of said record media.

3. An information translation system comprising record means for translating successive information codes to and from recording in record media, said recording being by successive preselected code recording positions preselected by groups thereof to constitute recording fields of said media, printing means for reproducing printed copy concurrently with said translation of information, programming means for effecting selectably independent and selectably concurrent programmed control over the operations of said printing and record means, and means responsive to field indicia information supplied by operation of said record means for permitting with respect each field of said record media initiation of continued operations of at least one of said printing and programming means.

4. An information translation system comprising record means for translating successive information codes to and from recording in record media, said recording being by successive preselected code recording positions preselected by groups thereof to constitute recording fields of said media, printing means manually and automatically operable to reproduce printed copy concurrently with said translation of information, manual control means, programming means having each of its operating intervals initiated by said manual control means but automatically terminated under program control for programming selected automatic operations of said printing means, and means responsive to field indicia supplied by operation of said record means for conditioning said manual control means to initiate each operation of said programming means.

5. An information translation system comprising record means for translating successive information codes to and from recording in record media, said recording being by successive preselected code recording positions preselected by groups thereof to constitute recording fields of said media, printing means for reproducing printed copy concurrently with said translation of information, programming means for effecting selectably independent and selectably concurrent programmed control over the operations of said printing and record means, and means deactivated by preselected programmed operations of said printing means and activated by field indicia information supplied by operation of said record means for controlling the operation of said programming means in relation to recording fields of said media.

6. An information translation system comprising record means for translating successive information codes to and from recording in record media, said recording being by successive preselected code recording positions preselected by groups thereof to constitute recording fields of said media, printing means for reproducing printed copy concurrently with said translation of information, programming means for effecting selectably independent and selectably concurrent programmed control over the operations of said printing and record means, means for manually initiating each operation of said programming means, and means responsive to field indicia supplied by operation of said record means for conditioning said last named means to effect each initiation of operation of said programming means.

7. An information translation system comprising record means for translating successive information codes to and from recording in record media, said recording being by successive preselected code recording positions preselected by groups thereof to constitute recording fields of said media, printing means for reproducing printed copy concurrently with said translation of information, programming means for programming automatic operations of said printing means and record means, and means responsive to programmed control by said programming means over record-field selection operations of said record means for halting operation of said programming means until completion of each said record field selection operation.

8. An information translation system comprising record means for translating successive information codes to and from recording in record media, said recording being by successive preselected code recording positions preselected by groups thereof to constitute recording fields of said media, printing means for reproducing printed copy concurrently with said translation of information, said printing means including a longitudinally movable paper transporting carriage, programming means for programming automatic operations of said printing means and record means, means responsive to preselected programmed control by said programming means over carriage positioning operations of said printing means for halting operation of said programming means until completion of each said carriage positioning operation, and means responsive to field indicia information supplied by operation of said record means for reinitiating operation of said programming means.

9. An information translation system comprising record means for translating successive information codes to and from recording in record media, said recording being by successive preselected code recording positions preselected by groups thereof to constitute recording fields of said media, manually and automatically operable printing means for reproducing printed copy concurrently with said translation of information, programming means for programming automatic operations of said printing means and record means, and means responsive successively to a programmed concurrent halt in the operation of all of said means and thereafter to field indicia information supplied by operation of said record means for conditioning said printing means to resume manual and automatic operation and said programming means for continuing programmed operations.

10. An information translation system comprising record means for translating successive information codes to and from recording in record media, said recording being by successive preselected code recording positions preselected by groups thereof to constitute recording fields of said media, printing means having a manually actuatable keyboard and operable to reproduce printed copy concurrently with said translation of information, programming means for effecting programmed operations of at least one of said printing and record means, means responsive to a programmed concurrent halt in the operation of all of said means to lock up the keyboard of said printing means, and means responsive to field indicia information supplied by operation of said record means for unlocking the keyboard of said printing means.

11. An information translation system comprising record means for translating successive information codes to and from recording in record media, said recording being by successive preselected code recording positions preselected by groups thereof to constitute recording fields of said media, printing means having a manually actuatable keyboard and operable to reproduce printed copy concurrently with said translation of information, programming means for effecting programmed operations of at least one of said printing and record means, means responsive to initiation of an effective record skip operation of said record means for locking the keyboard of said printing means, and means responsive to field indicia information supplied by operation of said record means upon completion of said skip operation for unlocking the keyboard of said printing means.

12. An information translation system comprising record means for translating successive information codes to and from recording in tabulating cards, said recording being preselected index-point recording columns preselected by groups thereof to constitute recording fields in each said card, printing means having a manual actuatable keyboard and operable to reproduce printed copy concurrently with said translation of information, means responsive to initiation of a card release operation of said record means for locking the keyboard of said printing means, and means responsive to field indicia information supplied by operation of said record means upon completion of said card release operation and coincidently with preselected registration of a recording field of a new card positioned in said record means for unlocking the keyboard of said printing means.

13. An information translation system comprising record means for translating successive information codes to and from recording in record media, said recording being by successive preselected code recording positions preselected by groups thereof to constitute recording fields of said media, printing means for reproducing printed copy concurrently with said translation of information, programming means for effecting programmed operations of at least one of said printing and record means, means responsive to preselected operations of each of said printing means and record means which require a relatively prolonged interval for their completion for halting the operation of said programming means, and means responsive to field indicia information supplied by operation of said record means for effecting resumed operation of said programming means.

14. An information translation system comprising record means for translating successive information codes to and from recording in record media advanced by successive preselected code recording positional steps through said record means, record programming means movable in unison with said record media for providing a field indication for each of preselected groups of successive recording positions constituting a recording field thereof, printing means for reproducing printed copy concurrently with said translation of information, operational programming means for programming the operations of at least one of said printing and record means, and means responsive to said field indications for controlling the interrelated operations of said record means and at least one of said printing means and operational programming means.

15. An information translation system comprising record means for translating successive information codes to and from recording in record media advanced by successive preselected code recording positional steps through said record means, record programming means moving in unison with said reocrd media for providing a field indication for each of preselected groups of successive recording positions constituting a recording field thereof and for perselectably automatically controlling with relation to said recording fields selectable operations of said record means, printing means for reproducing printed copy concurrently with said translation of information, operational programming means for programming the operations of at least one of said printing and record means, and means responsive to said field indications for controlling the interrelated operations of said record means and at least one of said printing means and operational programming means.

16. An information translation system comprising record means for translating successive information codes to and from recording in record media advanced by successive preselected code recording positional steps through said record means, record programming means moving in unison with said record media for providing a field indication at the first recording position of each preselected group thereof constituting a recording field of said media, printing means for reproducing printed copy concurrently with said translation of information, print programming means having program controlled operating intervals for programming the operations of said printing means, and means activated by said field indications for conditioning said print programming means for activation through a succeeding operating interval thereof.

17. An information translation system comprising record means for translating successive information codes to and from recording in record media, said recording being by successive preselected code recording positions preselected by groups thereof to constitute recording fields of said media, printing means for reproducing printed copy concurrently with said translation of information, control means having two operative states in one of which operation of said printing means is permitted and in the other of which operation of said printing means is terminated, means responsive to field indicia information supplied by operation of said record means for actuating said control means to said one operative state thereof, and means responsive to preselective operations of said printing means for actuating said control means to said other operative state thereof.

18. An information translation system comprising record means for translating successive information codes to and from recording in record media, said recording being by successive preselected code recording positions preselected by groups thereof to constitute recording fields of said media, printing means for reproducing printed copy concurrently with said translation of information, said printing means including a paper transporting carriage, control means having two operative states in one of which operation of said printing means is permitted and in the other of which operation of said printing means is terminated, means responsive to field indicia information supplied by operation of said record means for actuating said control means to said one operative state thereof, and means responsive to preselected carriage-controlled operations of said printing means for actuating said control means to said other operative state thereof.

19. An information translation system comprising record means for reading successive information codes recorded in record media, said recording being by successive preselected code recording positions preselected by groups thereof to constitute recording fields of said media, printing means responsive to functional-control and character-print information codes supplied thereto for printing copy, means responsive to each cycle of reading operation of said record means for initiating and controlling a corresponding cycle of operation of said printing means to print information read from said record media, programming means for controlling said printing means and said record means to translate to said printing means functional-control and character-print coded information selectively supplied from said record media and from said programming means, and means responsive to field indicia information supplied by operation of said record means for permitting reactivation of said programming means after the operation of said programming means has been terminated by preselected programmed operations.

20. An information translation system comprising record means for reading successive information codes recorded in record media, said recording being by successive preselected code recording positions preselected by groups thereof to constitute recording fields of said media, printing means responsive to functional-control and character-print information codes supplied thereto for printing copy, means responsive to each cycle of reading operation of said record means for initiating and controlling a corresponding cycle of operation of said printing means to print information read from said record media, programming means for controlling said printing means and said record means to translate to said printing means functional-control and character-print coded information selectively supplied from said record media and from said programming means, and means responsive to programmed control by said programming means of record-selection operations of said record means for halting operation of said programming means until completion of each record-selection operation.

21. An information translation system comprising record means for translating successive information codes to and from recording in record media, said recording being by successive preselected code recording positions preselected by groups thereof to constitute recording fields of said media, printing means for controlling said record means by recording positions and fields of said record media and for reproducing printed copy concurrently with said translation of information, programming means for effecting programmed operations of at least one of said printing and record means, and means responsive to field indicia information supplied by operation of said record means for controlling interrelated operations of said record means and at least one of said printing and programming means.

22. An information translation system comprising record means for translating successive information codes to record media for recording thereby in successive preselected code recording positions preselected by groups thereof to constitute recording fields of said media, printing means operable manually and in response to functional-control and character-print information codes supplied thereto for printing successive lines of copy each formed of successively printed characters and intercharacter spaces, means responsive to each character-print and intercharacter spacing operation of said printing means for controlling said record means to effect a corresponding positional space of said media and concurrent information recording thereby, programming means for supplying said functional-control and character-print information codes to said printing means, and means responsive to field indicia information supplied by operation of said record means for controlling activation of said programming means.

23. An information translation system comprising record means for translating successive information codes for recording in record media advanced by successive preselected code recording positional steps through said record means, record programming means moving in unison with said record media for providing a field indication for each of preselected groups of successive recording positions constituting a record field thereof, printing means for controlling said record means by recording positions and fields of said record media to reproduce printed copy concurrently with said translation of information, operational programming means for programming the operations of at least one of said printing and record means, and means responsive to said field indications for controlling the interrelated operations of said record means and at least one of said printing means and operational programming means.

24. An information translation system comprising means for printing copy while concurrently developing character-print and functional-control information required to duplicate said copy, first record means for recording in a first record medium successive information codes at preselected code recording positions preselected by groups thereof to constitute recording fields of said medium, second record means for recording in a second record medium successive information codes, means for selectively translating said developed information of said printing means to each of said first and second record means for recording thereby, and means controlled by said first record means for permitting initiation of operation of said printing means only when the record medium of said first record means is in readiness to record in the initial recording position of any selected recording field thereof.

25. An information translation system comprising manually and automatically operable printing means for printing copy while concurrently developing character-print and functional-control information required to duplicate said copy, first record means for recording in a first record medium successive information codes at preselected code recording positions preselected by groups thereof to constitute recording fields of said medium, second record means for recording in a second record medium successive information codes, means for selectively translating developed information of said printing means to each of said first and second record means for recording thereby, and means controlled by said first record means for permitting each initiation of manual and automatic operations of said printing means only when the record medium of said first record means is in readiness to record in the initial recording position of any selected recording field thereof.

26. An information translating system comprising record means for recording in a record medium successive information codes at preselected code recording positions preselected by groups thereof to constitute recording fields of said medium, printing means for controlling said record means by recording positions and fields of said record medium while concurrently printing copy and supplying information codes to said record means to be recorded thereby, and means responsive to field indicia information supplied by operation of said record means for controlling the continuing operative state of said printing means in print-coordinated relation to preselected recording positions of the recording fields of said record medium.

27. An information translating system comprising record means for recording in a record medium successive information codes at preselected code recording positions preselected by groups thereof to constitute recording fields of said medium, printing means for controlling said record means by recording positions and fields of said record medium while concurrently printing copy and supplying information codes to said record means to be recorded thereby, said printing means including a paper transporting carriage, and means controlled by preselected carriage operations and responsive to field indicia information supplied by operation of said record means for controlling the operative state of said printing means in relation to preselected recording positions of the recording fields of said record medium.

28. An information translating system comprising record means for recording in a record medium successive information codes at preselected code recording positions preselected by groups thereof to constitute recording fields of said medium, printing means for controlling said record means by recording positions and fields of said record medium while concurrently printing copy and supplying information codes to said record means to be recorded thereby, programming means for effecting program controlled operations of said printing means, and means controlled by each controlled halt of the operation of said printing means and responsive to field indicia information supplied by operation of said record means for controlling the operative states of said printing and programming means in relation to preselected recording positions of the recording fields of said record medium.

29. An information translating system comprising record means for recording in a record medium successive information codes at preselected code recording positions preselected by groups thereof to constitute recording fields of said medium, printing means for controlling said record means by recording positions and fields of said record medium while concurrently printing copy and supplying information codes to said record means to be recorded thereby, programming means for effecting program controlled operations of said printing means, manually actuatable means for halting the operation of said programming means, and means controlled by each actuation of said manual means and each program controlled halt of the operation of said printing means and responsive to field indicia information supplied by operation of said record means for controlling the operative states of said printing and programming means in relation to preselected recording positions of the recording fields of said record medium.

30. An information translating system comprising record means for recording in a record medium successive information codes at preselected code recording positions preselected by groups thereof to constitute recording fields of said medium, printing means for controlling said record means by recording positions and fields of said record medium while concurrently printing copy and supplying information codes to said record means to be recorded thereby, control means having two operative states in one of which operation of said printing means is permitted and in the other of which operation of said printing means is terminated, means responsive to field indicia information supplied by operation of said record means for actuating said control means to said one operative state thereof, and means responsive to preselected operations of said printing means for actuating said control means to said other operative state thereof.

31. An information translating system comprising record means for recording in a record medium successive information codes at preselected code recording positions preselected by groups thereof to constitute recording fields of said medium, printing means for controlling said record means by recording positions and fields of said record medium while concurrently printing copy and supplying information codes to said record means to be recorded thereby, said printing means including a paper transporting carriage, control means having two operative states in one of which operation of said printing means is permitted and in the other of which operation of said printing means is terminated, means responsive to field indicia information supplied by operation of said record means for actuating said control means to said one operative state thereof, and means responsive to preselected carriage-controlled operations of said printing means for actuating said control means to said other operative state thereof.

32. An information translating system comprising record means for recording in a record medium successive information codes at preselected code recording positions preselected by groups thereof to constitute recording fields of said medium, printing means for controlling said record means by recording positions and fields of said record medium while concurrently printing copy and supplying information codes to said record means to be recorded thereby, said printing means including a paper transporting carriage, means responsive to carriage tabulation and carriage return operations of said printing means for controlling said record means to effect concurrent selection of respective recording fields and record areas of said recording medium, and means responsive to field indicia control supplied by operation of said recording means for permitting resumed operation of said printing means after each said carriage return and tabulation operation thereof only when the resumed recording by said record means is initiated in relation to preselected recording positions of the record fields of said medium.

33. An information translating system comprising record means for recording in a record medium successive information codes at preselected code recording positions preselected by groups thereof to constitute recording fields of said medium, printing means for controlling said record means by recording positions and fields of said record medium while concurrently printing copy and supplying information codes to said record means to be recorded thereby, means included in said record means for duplicating preselectable recorded information from one record area of said medium to another record area thereof, means controlled by said printing means for actuating said duplicating means to effect an information duplication operation by said record means, and means responsive to field indicia supplied by operation of said record means for permitting the operation of said printing means to be resumed after each said duplication operation only when the resumed recording by said record means is initiated in relation to preselected recording positions of the record fields of said medium.

34. An information translating system comprising record means for recording in a record medium successive information codes at preselected code recording positions preselected by groups thereof to constitute recording fields of said medium, means for reading information recorded in said medium, printing means for controlling said recording and reading means by recording positions and fields of said record medium while concurrently printing copy and supplying information codes to said record means to be recorded thereby, means selectable to terminate the operation of said printing means and for concurrently supplying to said recording means information read by said reading means to duplicate a preselectable field of recorded information from one record area of said medium to another record area thereof, and means responsive to completion of each duplication operation and to field indicia supplied by operation of said recording means for permitting resumed operation of said printing means only when a field of said medium bears a preselected positional relationship to said recording means.

35. An information translation system comprising: printing means operable manually and in response to character-print and functional-control information supplied thereto for printing copy while concurrently developing character-print and functional-control information required to duplicate said copy; program means for supplying under program control character-print and functional-control information to said printing means for automatic control thereof; means for receiving and recording said developed character-print information in a record medium having preselected recording fields within recording areas thereof; control means responsive to each programmed stop, each tabulation operation and each line spacing operation of said printing means for deactivating said printing means for both manual and automatic operation while concurrently controlling said recording means to effect respectively an operational stop thereof, a record medium field selection thereby, and a record medium area selection thereby; and means controlled by said recording means in response to the attainment of a preselected positional recording relationship with respect each recording field of said medium for controlling said control means to reactivate said printing means for both manual and automatic operation.

36. An information translation system comprising printing means operable both manually and under automatic control to develop character-print and functional-control information required to duplicate printed copy, programming means for effecting said automatic operation of said printing means to develop said information, means for receiving and recording said developed information in successive recording positions grouped into successive recording fields of a record medium moving therethrough, means responsive to preselected ones of the automatic and manual functional controls of said printing means for terminating development of said information by said printing means while concurrently controlling said recording means to effect control of recording field selections thereby, and means responsive to the positioning of said record medium in said recording means in readiness to initiate recording in a new recording field thereof for permitting continuation of development of said information by said printing means by manual and automatic operation thereof.

37. An information translation system comprising printing means operable both manually and under automatic control to develop character-print and functional-control information required to duplicate copy printed thereby but including means selectable to suppress printing by said printing means while continuing the development thereby of said information, manual means and programming means for effecting said manual and automatic operations of said printing means to develop said information, means selectively actuatable to record said developed information in a record medium, and means operable to effect selective actuation of said recording means only during print intervals of said printing means and thereafter effecting selective deactuation of said recording means during both print and print-suppress intervals thereof.

38. An information translation system comprising printing means operable both manually and under automatic control to develop character-print and functional-control information required to duplicate copy printed thereby but including means selectable to suppress printing by said printing means while continuing the development thereby of said information, manual means and programming means for effecting said manual and automatic operations of said printing means to develop said information, means selectively actuatable to record said developed information in a record medium, and means operable to effect selective actuation and deactuation of said recording means only during print intervals of said printing means.

39. A printer comprising a paper transporting carriage, character-print type levers pivoted in a type basket and each including a type character in a common one of two possible type-character positions thereon, shift means for providing relative movement of said basket and carriage to each of two positions in one of which actuation of said type levers effects character-printing and in the other of which actuation of said type levers is accompanied by suppression of character-printing, means responsive to said type lever actuations to develop character-print information required to duplicate copy printable in said one relative position of said basket and carriage, means selectively actuatable to record said developed information in a record medium, and means selectively operable only while said basket and carriage are in said one relative position thereof to effect selective actuation of said recording means.

40. A printer comprising a paper transporting carriage, character-print type levers pivoted in a type basket and each including a type character in a common one of two possible type-character positions thereon, shift means for providing relative movement of said basket and carriage to each of two positions in one of which actuation of said type levers effects character-printing and in the other of which actuation of said type levers is accompanied by suppression of character-printing, means responsive to said type lever actuations to develop character-print information required to duplicate copy printable in said one relative position of said basket and carriage, means selectively actuatable to record said developed information in a record medium, and means selectively operable only while said basket and carriage are in said one relative position thereof to effect selective actuation of said recording means but selectively operable in both said one and said other relative positions thereof to deactuate said recording means.

41. A printer comprising a paper transporting carriage, character-print type levers pivoted in a type basket and each including a type character in a common one of two possible type-character positions thereon, shift means for providing relative movement of said basket and carriage to each of two positions in one of which actuation of said type levers effects character-printing and in the other of which actuation of said type levers is accompanied by suppression of character-printing, means responsive to said type lever actuations to develop character-print information required to duplicate copy printable in said one relative position of said basket and carriage, means selectively actuable to record said developed information in a record medium, and means selectively operable only while said basket and carriage are in said one relative position thereof for selectively actuating and thereafter selectively deactuating said recording means.

42. An information translation system comprising printing means operable to develop character-print and functional-control information required to duplicate printed copy, tabulating card means controlled by said printing means for recording said developed information in tabulating cards by use of successive character recording positions grouped by preselected fields thereof, means responsive to each tabulation operation of said printing means for controlling said tabulating card means to effect automatic skipping of at least a terminal portion of a tabulating card recording field, and means responsive to each line-space operation of said printing means for controlling said tabulating card means automatically to release a tabulating card from recording position and effect insertion of a new card in recording position therein.

43. An information translation system comprising printing means operable to develop character-print and functional-control information required to duplicate printed copy, tabulating card means controlled by said printing means for recording said developed information in tabulating cards by use of successive character recording positions grouped by preselected fields thereof, means responsive to each tabulation operation of said printing means for controlling said tabulating card means to effect automatic skipping of at least a terminal portion of a tabulating card recording field, means responsive to each line-space operation of said printing means for controlling said tabulating card means automatically to release a tabulating card from recording position and effect insertion of a new card in recording position therein, and means controlled by said printing means for selectively duplicating from a preceding to a succeding card information recorded in said preceding card.

44. An information translation system comprising printing means operable to develop character-print and functional-control information required to duplicate printed copy, tabulating card means controlled by said printing means for recording said developed information in tabulating cards by use of successive character recording positions grouped by preselected fields thereof, means responsive to each tabulation operation of said printing means for controlling said tabulating card means to effect automatic skipping of at least a terminal portion of a tabulating card recording field, means responsive to each line-space operation of said printing means for controlling said tabulating card means automatically to release a tabulating card from recording position and effect insertion of a new card in recording position therein, means controlled by said printing means for selectively duplicating from a preceding to a succeeding card information recorded in said preceding card, and means actuated by said tabulation card means during each skipping and card release operation thereof for automatically halting the operation of said printing means.

45. An information translation system comprising printing means operable to develop character-print and functional control information required to duplicate printed copy; tabulating card means controlled by said printing means for recording said developed information in tabulating cards by use of successive character recording positions grouped by preselected fields thereof; means responsive to each tabulation operation of said printing means for controlling said tabulating card means to effect automatic skipping of at least a terminal portion of a tabulating card recording field; means responsive to each line-space operation of said printing means for controlling said tabulating card means automatically to release a tabulating card from recording position and effect insertion of a new card in recording position therein; means controlled by said printing means for selectively duplicating from a preceding to a succeeding card information recorded in said preceding card; and means actuated by said tabulating card means during each skipping operation, each card release operation, and each intercard information duplication operation thereof for automatically halting the operation of said printing means.

46. An information translation system comprising printing means operable to develop character-print and functional-control information required to duplicate printed copy, tabulating card means controlled by said printing means for recording said developed information in tabulating cards by use of successive character recording positions grouped by preselected fields thereof, means responsive to each tabulation operation of said printing means for controlling said tabulating card means to effect automatic skipping of at least a terminal portion of a tabulating card recording field, means responsive to each line-space operation of said printing means for controlling said tabulating card means automatically to release a tabulating card from recording position and effect insertion of a new card in recording position therein, means controlled by said printing means for selectively duplicating from a preceding to a succeeding card information recorded in said preceding card, and means responsive to the recording-field positioning of a tabulating card in said recording means in readiness to initiate recording at the beginning of each of preselected recording fields thereof for controlling said printing means to permit resumed operations thereof.

47. An information translation system comprising printing means operable to develop character-print and functional-control information required to duplicate printed copy; tabulating card means controlled by said printing means for recording said developed information in tabulating cards by use of successive character recording positions grouped by preselected fields thereof; means responsive to each tabulation operation of said printing means for controlling said tabulating card means to effect automatic skipping of at least a terminal portion of a tabulating card recording field; means responsive to each line-space operation of said printing means for controlling said tabulating card means automatically to release a tabulating card from recording position and effect insertion of a new card in recording position therein; means controlled by said printing means for selectively duplicating from a preceding to a suceeding card information recorded in said preceding card; means actuated by said tabulating card means during each skipping operation, each card release operation, and each inter-card information duplication operation thereof for automatically halting the operation of said printing means; and means responsive to the recording-field positioning of a tabulating card in said recording means in readiness to initiate recording at the beginning of each of preselected recording fields thereof for controlling said printing means to permit resumed operations thereof.

48. An information translation system comprising printing means operable to develop character-print and functional-control information required to duplicate printed copy, tabulating card means controlled by said printing means for recording said developed information in tabulating cards by use of successive character recording positions grouped by preselected fields thereof, means responsive to each tabulation operation of said printing means for controlling said tabulating card means to effect automatic skipping of at least a terminal portion of a tabulating card recording field, means responsive to each line-space operation of said printing means for controlling said tabulating card means automatically to release a tabulating card from recording position and effect insertion of a new card in recording position therein, programming means for automatically controlling operations of said printing means including programmed operational halts thereof, means controlled by said printing means for selectively duplicating from a preceding to a succeeding card information recorded in said preceding card, means actuated by said tabulation card means during each skipping and card release operation thereof for automatically halting the operation of said printing means, and means actuated subsequent to each said operational halt of said printing means and in response to the recording-field positioning of a tabulating card in said tabulating card means in readiness to initiate recording at the beginning of each of preselected recording fields thereof for controlling said printing means to permit resumed operation thereof.

49. An information translation system comprising printing means operable to develop character-print and functional-control information required to duplicate printed copy, tabulating card means controlled by said printing means for recording said developed information in tabulating cards by use of successive character recording positions grouped by preselected fields thereof, means responsive to each tabulation operation of said printing means for controlling said tabulating card means to effect automatic skipping of at least a terminal portion of a tabulating card recording field, means responsive to each line-space operation of said printing means for controlling said tabulating card means automatically to release a tabulating card from recording position and effect insertion of a new card in recording position there-

[redacted]

UNITED STATES PATENT OFFICE

CERTIFICATION OF CORRECTION atent No. 3,039,679 June 19, 1962

Jay C. Shaver

It is hereby certified that error appears in the above numbered patent requiring correction and that the said Letters Patent should read as corrected below.

Column 4, line 70, for "whil ethe" read -- while the --; column 6, line 38, for "holding" read -- hold --; line 65, for "skilled" read -- skipped --; column 7, line 4, for "which" read -- what --; line 59, for "beetween" read -- between --; line 75, for "interposed" read -- interposer --; column 9, line 39, after "delay" insert -- relay --; column 15, lines 35 and 36, for "whereupon" read -- thereupon --; column 22, line 12, for "mode" read -- code --; column 24, line 71, after "on" strike out "relays"; column 26, line 21, for "etach" read -- each --; line 49, for "contact" read -- contacts --; column 27, line 30, before "groups" insert -- by --; column 29, line 53, before "preselected" insert -- by --; column 30, line 28, for "reocrd" read -- record --; line 31, for "perselectably" read -- preselectably --; column 34, lines 2 and 3, for "recoding" read -- recording --; column 38, line 21, for "suceeding" read -- succeeding --.

Signed and sealed this 6th day of November 1962.

(SEAL)
Attest:

ERNEST W. SWIDER
Attesting Officer

DAVID L. LADD
Commissioner of Patents